(12) United States Patent
Kowarz et al.

(10) Patent No.: US 7,342,658 B2
(45) Date of Patent: Mar. 11, 2008

(54) PROGRAMMABLE SPECTRAL IMAGING SYSTEM

(75) Inventors: Marek W. Kowarz, Henrietta, NY (US); David L. Patton, Webster, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 118 days.

(21) Appl. No.: 11/319,933

(22) Filed: Dec. 28, 2005

(65) Prior Publication Data

US 2007/0146700 A1 Jun. 28, 2007

(51) Int. Cl.
*G01J 3/28* (2006.01)

(52) U.S. Cl. .................. 356/328; 356/326; 356/320; 356/300

(58) Field of Classification Search ............ 356/328, 356/326, 310, 320, 330, 300; 250/461.2; 359/298, 308, 297
See application file for complete search history.

(56) References Cited

U.S. PATENT DOCUMENTS

| | | | |
|---|---|---|---|
| 5,689,317 A | 11/1997 | Miller et al. | |
| 5,784,162 A | 7/1998 | Cabib et al. | |
| 5,828,451 A | 10/1998 | Bellus et al. | |
| 5,892,612 A | 4/1999 | Miller et al. | |
| 6,295,130 B1 | 9/2001 | Sun et al. | |
| 6,307,663 B1 | 10/2001 | Kowarz | |
| 6,760,475 B1 | 7/2004 | Miller et al. | |
| 6,781,691 B2* | 8/2004 | MacKinnon et al. | 356/326 |
| 2002/0176151 A1* | 11/2002 | Moon et al. | 359/298 |
| 2004/0090679 A1* | 5/2004 | Kowarz | 359/634 |

OTHER PUBLICATIONS

R.A. DeVerse et al; "Realization of the Hadamard Multiplex Advantage Using A Programmable Optical Mask in a Dispersive Flat-Field Near-Infrared Spectrometer", Applied Spectroscopy 54; pp. 1751-1758, 2000.

C.M. Wehlburg et al; "Optimization & Characterization of an Imaging Hadamard Spectrometer"; Proc. SPIE 4381 pp. 506-515 (2001).

* cited by examiner

*Primary Examiner*—Layla G. Lauchman
*Assistant Examiner*—Abdullahi Nur
(74) *Attorney, Agent, or Firm*—Stephen H. Shaw

(57) ABSTRACT

An imaging apparatus for obtaining spectral image data from an object that includes: a) a light source; b) an input optics section; c) a programmable spectral filter that conditions the multispectral image bearing light according to a predetermined spectral transmission function; d) a detector array in the path of the conditioned multispectral image bearing light and providing a corresponding output signal; and, e) a control logic processor in communication with the spatial light modulator for modulating addressable areas of the spatial light modulator to provide the spectral transmission function thereby.

6 Claims, 19 Drawing Sheets

PROGRAMMABLE SPECTRAL IMAGING SYSTEM

FIELD OF THE INVENTION

The invention relates generally to imaging systems and in particular to a multi-band spectral imaging system that is electronically controllable, using a wavelength-distributing element, a spatial light modulator for selection of spectral components to be imaged, and a wavelength recombining element.

BACKGROUND OF THE INVENTION

Multi-spectral imaging (MSI) and hyper-spectral imaging (HSI) systems, in which more than 3 spectral bands are captured by an imager, are of particular interest for a variety of applications. Originally exploited for use in aerial and satellite imaging, spectral imaging apparatus and techniques are more recently being applied to a broad range of applications where the spectral content of light yields significant information about a structure or tissue, including remote sensing, industrial sensing, and biological and health imaging. As is described in U.S. Pat. No. 5,784,162 entitled "Spectral Bio-Imaging Methods for Biological Research, Medical Diagnostics, and Therapy" to Cabib et al., spectral imaging can be used to detect cell constituents such as proteins tagged with fluorescent probe substances, to distinguish cancer cells from healthy cells, and in a range of imaging applications. Spectral imaging shows significant promise, for example, in detection of precursor cell structures in cancer diagnosis. Unlike biopsy, which is invasive, offers delayed results, and can be highly localized so that it can miss some types of significant changes, spectral imaging techniques for cancer detection are minimally invasive, operate in real time, and can perform over sizable tissue areas. Spectral imaging techniques can be applied for detection and quantitative measurement of microscopic morphological and biochemical changes and are anticipated to serve as valuable tools for early disease detection. Spectral imaging has also been shown to be of value for wound assessment. Other medical applications served by spectral imaging methods include microscopy, endoscopy, and fundus imaging.

Other uses for spectral imaging include applications in industrial sensing and process control. Spectral imaging is advantaged over other imaging techniques since it is able to obtain a continuous spectral "fingerprint" for an image over a range of wavelengths including UV and IR. Because of this, spectral imaging is able to reveal the "hidden" morphology of an object under test. This enables spectral imaging systems to be used in applications such as non-contact detection systems for ascertaining fruit ripeness, for example. Still other uses for spectral imaging include remote sensing applications.

Multi-spectral imaging systems are typically designed with thin-film spectral filters situated in front of detector arrays. MSI systems provide good image quality with short detector integration times and modest sized data sets. They are used in both line-scanned configurations, with linear detector arrays, and in full-field configurations, with area detector arrays. The MSI approach can image only a relatively small number of spectral bands, typically from about 4 to about 8, with the band selection filter response fixed once the system is built.

Hyper-spectral imaging systems, on the other hand, use a dispersive element, such as a grating or prism, for example, to spatially disperse an input image signal onto an area detector array, providing one spatial axis and one spectral axis. HSI systems can be more capable than MSI systems, are able to capture a vast amount of spectral information in a number of very narrow spectral bands, and are generally more flexible than MSI systems. However, this added capability comes at a price: for example, signal acquisition times for HSI are much longer than for MSI, the data sets are extremely large and spatial resolution may be compromised. In practice, typically only a small subset of the captured hyper-spectral data cube is of interest.

There have been a number of proposed solutions for programmable spectrometers and programmable spectral imaging systems, in which the spectral transmission function can be more readily modified. Electronically controlled light modulators have been used in either of two fundamentally different base configurations:

1) as a type of tunable transmission filter; or,
2) as a programmable dispersion-based system, using a spatial light modulator consisting of an array of individually addressable devices.

Tunable transmission filters have been disclosed using liquid crystal devices (LCDs), acousto-optical (AO) devices, and tunable Fabry-Perot cavities, for example. Liquid crystal tunable filters, which may be alternately called LC or LCD filters, have been disclosed in U.S. Pat. No. 5,689,317 entitled "TUNABLE COLOR FILTER" to Miller et al. issued Nov. 18, 1997 and in U.S. Pat. No. 5,892,612 entitled "TUNABLE OPTICAL FILTER WITH WHITE STATE" also to Miller et al., issued Apr. 6, 1999. An imaging apparatus using tunable LCD filters is disclosed in U.S. Pat. No. 6,760,475 entitled "COLORIMETRIC IMAGING SYSTEM" to Miller, issued Jul. 6, 2004.

While tunable LCD filters provide an effective solution for some imaging applications, these devices have some significant limitations. These limitations include some constraints on spectral range, temperature sensitivity, polarization sensitivity, relatively poor transmission characteristics, and relatively slow response times.

A programmable spectral imaging system using an acousto-optical tunable filter is disclosed, for example, in U.S. Pat. No. 5,828,451 entitled "SPECTRAL IMAGING SYSTEM AND METHOD EMPLOYING AN ACOUSTO-OPTIC TUNABLE FILTER FOR WAVELENGTH SELECTION WITH INCREASED FIELD OF VIEW BRIGHTNESS" to Bellus et al., issued Oct. 27, 1998. While tunable AO filters have utility some imaging applications, these devices have some significant limitations. These limitations include some spectral range constraints, relatively poor transmission characteristics, some reported temperature sensitivity, and constrained active area dimensions, with significant power requirements even for active areas of modest size.

A tunable Fabry-Perot filter for selecting visible wavelengths is disclosed in U.S. Pat. No. 6,295,130 entitled "STRUCTURE AND METHOD FOR A MICROELECTROMECHANICALLY TUNABLE FABRY-PEROT CAVITY SPECTROPHOTOMETER" to Sun et al., issued Sep. 25, 2001.

Programmable dispersion-based systems have been demonstrated using a variety of spatial light modulators, including liquid crystal display panels and, more recently, microelectromechanical mirror arrays, such as the Digital Micromirror Device (DMD) used in Digital Light Processor components from Texas Instruments, Dallas, Tex. for example. In the dispersion-based approach, input light is dispersed through a prism or grating in order to separate the various component wavelengths onto the spatial light modulator. The spatial light modulator then selects the wavelengths of interest and directs these to a detector. Typically, dispersion based systems have used a single detector element, for point-imaging or non-imaging applications. In a single-detector configuration, a 2D image can be generated by raster scanning an object of interest by using some scanning mechanism, such as a pair of scanning mirrors, for example. A non-imaging DMD-based spectrometer for sample analysis is described by R. A. DeVerse et al. in "Realization of the Hadamard Multiplex Advantage Using a Programmable Optical Mask in a Dispersive Flat-Field Near-Infrared Spectrometer" *Applied Spectroscopy*. 54, pp. 1751-1758 (2000). This disclosure indicates that, when many narrow spectral bands are of interest, marked signal-to-noise improvement can be obtained by a method of simultaneously measuring multiple bands and applying a Hadamard transform approach, rather than by measuring the spectral bands sequentially.

A dispersion-based programmable spectral imager that uses a detector array rather than a single detector is described by C. M. Wehlburg et al. in "Optimization and Characterization of an Imaging Hadamard Spectrometer" *Proc. SPIE* 4381, pp. 506-515 (2001). The disclosed Hadamard Transform Spectral Imager (HTSI) uses one Offner relay with a curved grating to disperse and reimage input light onto a DMD and a second Offner relay to de-disperse and reimage the selected components onto the detector array. Hampered by low contrast, low efficiency, sizable space requirements, and high fabrication costs, the HTSI system is optimized for telescopic point imaging of very small objects at a large distance. However, this system would provide very poor area imaging performance and would not be easily adapted for imaging extended objects or nearby objects, being prone to high levels of spectral crosstalk that would prevent satisfactory multicolor imaging.

While there have been a number of different design approaches adopted for programmable spectral imaging, there are significant drawbacks with each approach. For example, any one tunable filter component, such as the LCD and AO tunable filter devices described above, is designed to operate over a relatively narrow spectral range. These devices are temperature-sensitive, polarization sensitive, and provide generally poor contrast. The bandwidth of any one filter is generally fixed by filter design parameters; the tuning operation merely shifts the same transmission characteristics up or down the wavelength scale, without control of amplitude, bandwidth, or filter shape.

Referring to FIG. 1, there is shown a block diagram of the principal subsystems of a spectral imaging system 10 and the type of data that can be obtained. A light source 12 illuminates an object 14. A linear spectral imager 16 obtains spectral data from object 14, one line 18 at a time, as composite data of substantially all wavelengths over a range or as data of one or more selected wavelengths. In a scanning sequence, successive lines 18 can be obtained in order to form a two-dimensional image. Spectral imager 16 can optionally obtain complete spectral data for a single point location 20.

Spectral imaging system 10 can employ any of a number of types of imaging sensor, including both area and linear sensors. Depending on the design of spectral imager 16, spectral imaging system 10 may be a hyperspectral imaging system or a multi-spectral imaging system. In a typical hyperspectral imaging system, spectral imager 16 could use a grating or other dispersive component for dispersing the various spectral components of object 14 (FIG. 1) onto an area sensor. In a typical multispectral system, on the other hand, spectral imager 16 could contain a series of thin-film filters, for specific fixed wavelengths, directing light to parallel arrays of linear sensors. Multi-spectral imaging systems can provide high-resolution spectral images of large, extended objects or areas with excellent image quality, short detector integration times, and generally more manageable image data sets than hyperspectral imaging systems provide.

One class of spectral imaging system employs a spatial light modulator as a type of programmable spectral switch for directing selected bands of incident light obtained from an object field, in sequence, to a sensor. While this approach has been demonstrated successfully for point-imaging and for sensing apparatus that utilize a single detector element, however, it can be appreciated that there would be additional advantages to an imaging system of this type in which the programmable spectral switch provides a programmable equivalent to a color filter wheel. For such a system, it would be particularly advantageous to use a spatial light modulator that is highly efficient, provides high contrast, and operates at high switching speeds. It would also be advantageous to provide a type of programmable filter that would not only allow tuning of frequency such as can be obtained using some LCD tuned filters, AO filters, and Fabry-Perot filter components, but also allow some measure of control of key characteristics such as bandwidth and filter shape as well.

One particularly advantaged spatial light modulator is an electromechanical conformal grating device consisting of ribbon elements suspended above a substrate by a periodic sequence of intermediate supports, as disclosed by Kowarz in U.S. Pat. No. 6,307,663, entitled "Spatial Light Modulator With Conformal Grating Device" issued Oct. 23, 2001. The electromechanical conformal grating device is operated by electrostatic actuation, which causes the ribbon elements to conform around the support substructure, thereby producing a grating. The device of the '663 disclosure has more recently become known as the conformal GEMS device, or simply as the GEMS device, with GEMS standing for Grating ElectroMechanical System. The GEMS device possesses a number of attractive features. It provides high-speed digital light modulation with high contrast, high efficiency, and a relatively large active region. Significantly, the GEMS device is designed for on-axis illumination, unlike other types of high-speed electromechanical light modulators, such as the Digital Micromirror Device (DMD), that requires off-axis illumination angles. As a further advantage, the GEMS device can be fabricated as a linear device with a thin active area, able to modulate a thin line of an image at a time, or, alternately, can be fabricated with a relatively wide active area in order to modulate a wider segment of an image at one time.

The ability to analyze the spectral components of light from an object or device under test has great value in a number of industrial and product testing and inspection, medical diagnostic, and sensing applications. Thus, it can be seen that there is a need for a spectral imaging system that can be programmed to provide suitable frequency, bandwidth and filter shape characteristics for obtaining spectral data.

SUMMARY OF THE INVENTION

The present invention is directed to the need for a programmable spectral imaging system by providing an imaging apparatus for obtaining spectral image data from an object that includes:

a) a light source for directing light toward the object;
b) an input optics section for gathering light to obtain a multispectral image bearing light;
c) a programmable spectral filter that conditions the multispectral image bearing light according to a predetermined spectral transmission function;
d) a detector array in the path of the conditioned multispectral image bearing light and providing a corresponding output signal; and,
e) a control logic processor in communication with the spatial light modulator for modulating addressable areas of the spatial light modulator to provide the spectral transmission function thereby.

ADVANTAGEOUS EFFECT OF THE INVENTION

The present invention provides programmable spectral imaging system solutions that offer improved efficiencies, enhanced resolution, and excellent image quality.

It is a particular advantage of the apparatus of the present invention that, unlike conventional spectral imaging systems employing tuned LCD, AO, or Fabry-Perot filtering components, it allows programmable selection of multiple filter characteristics including central frequency, bandwidth, and filter shape.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Systems Using Dispersive Separation

Figure 2:
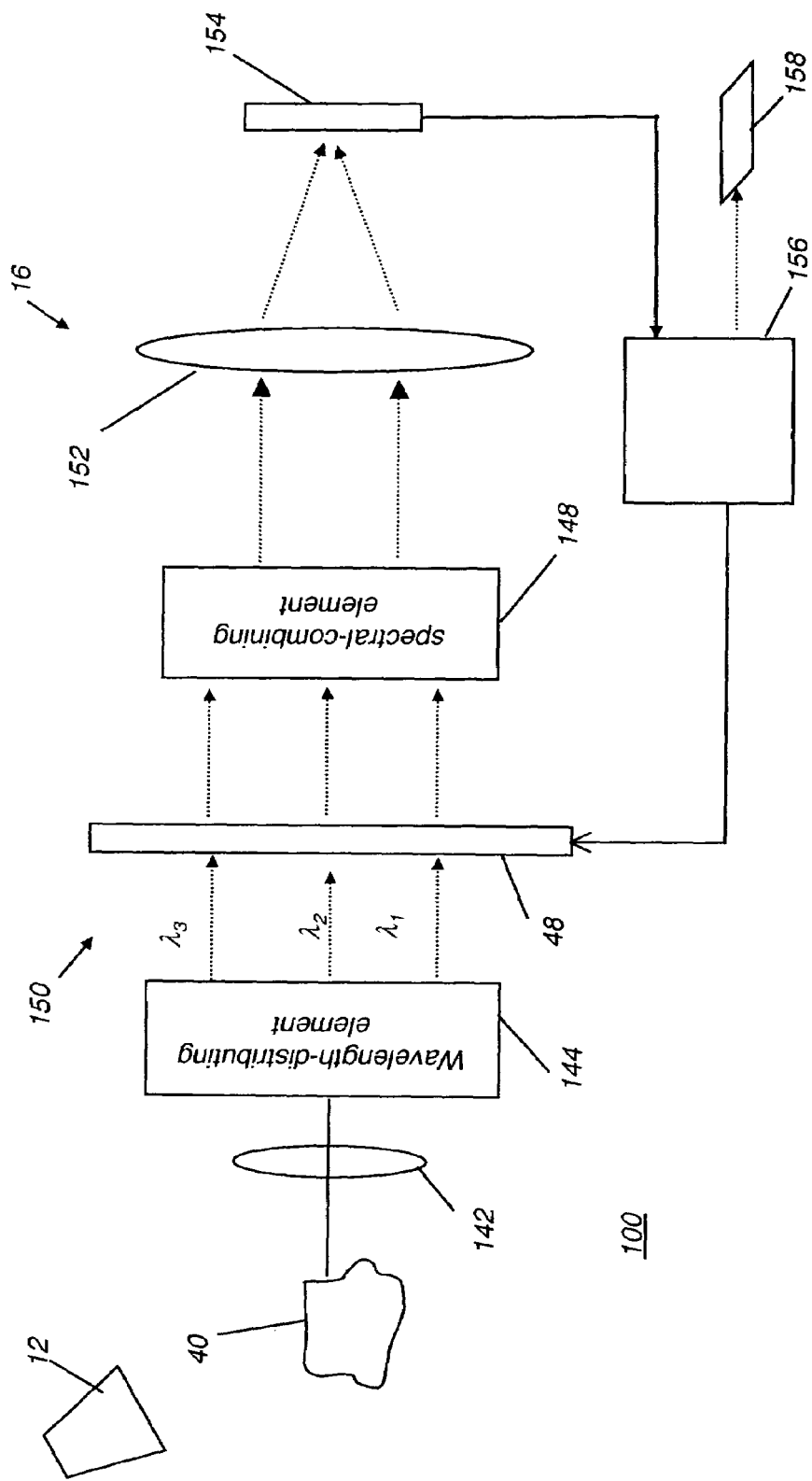
FIG. 2 is a block diagram showing a spectral imaging system using dispersion for spatial separation of spectral components and a tunable filter element according to the present invention.

Referring to FIG. 2, there is shown a schematic block diagram of an imaging apparatus 100 according to the present invention. An extended object 40, as the object under test, receives illumination from light source 12. In spectral imager 16, a multispectral image-bearing light, from a region of interest on extended object 40, is directed toward a wavelength-distributing element 144 by a lens 142.

The multispectral image-bearing light from extended object 40 may be reflected or transmitted light having some portion of the wavelengths emitted from light source 12. Alternately, light source 12 may provide a form of excitation energy that causes an illuminated portion of extended object 40 to emit a multi-wavelength image-bearing light having a different frequency. Excitation energy could alternately be provided by heating one or more portions of extended object 40 in yet another embodiment. The excited luminescent or fluorescent light emanating from extended object 40 in such a case would then form the multispectral image-bearing light that is processed by imaging apparatus 100.

Lens 142 directs multispectral image-bearing light from input multi-wavelength image 40 to a programmable spectral filter 150 having a wavelength-distributing element 144. Wavelength-distributing element 144 distributes the light from extended object 40 spatially, according to wavelength (λ) to provide a spatially distributed image-bearing light. This spatial distribution can be performed using dispersion or can be performed using dichroic separation.

Figure 1:
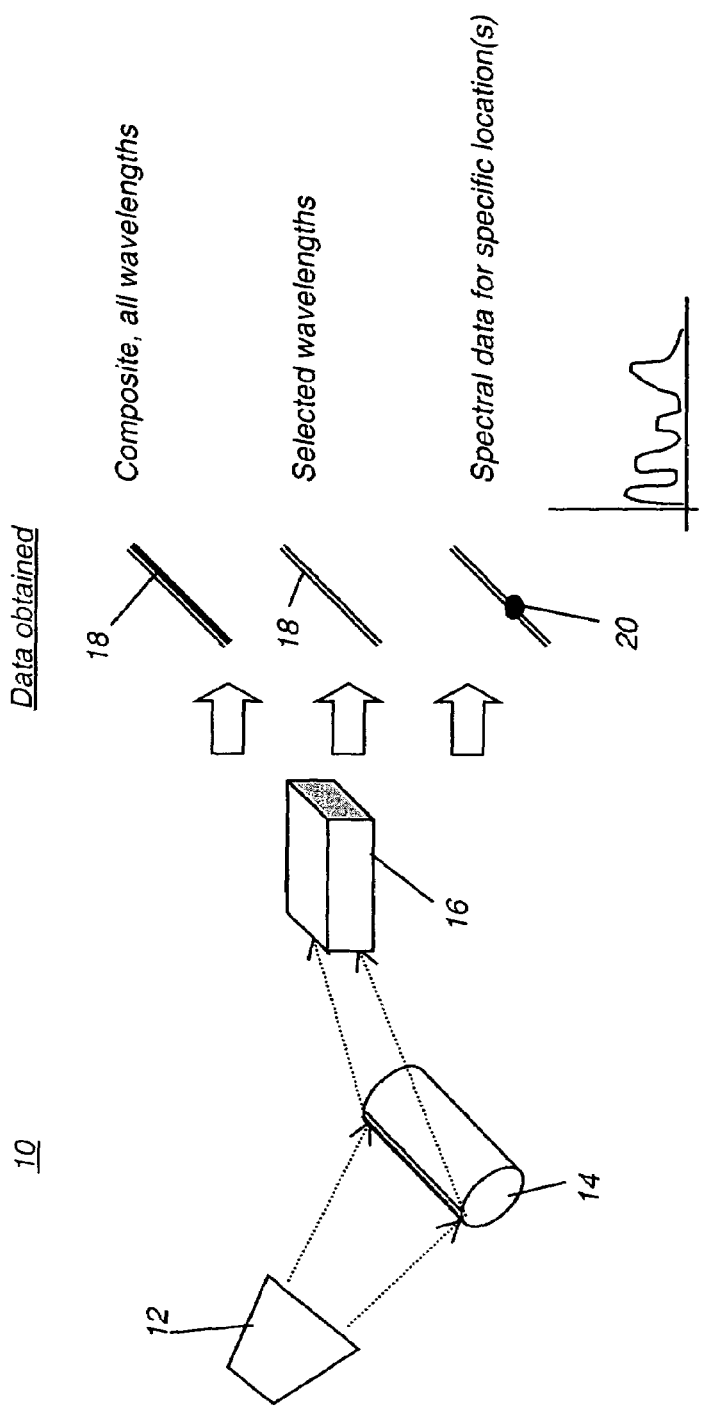
FIG. 1 is a schematic block diagram of a spectral imaging system and the types of data obtained.

A spatial light modulator 48 is configured as the programmable component of programmable spectral filter 150 that modulates the spatially separated spectral bands by selectively passing specific wavelengths and blocking or attenuating others, as programmed according to a spectral transmission function. The resulting modulated spectral bands of image-bearing light are then directed to a spectral combining element 148. Spectral combining element 148 recombines the modulated spatially separated wavelengths and removes the angular difference between the various wavelengths, thereby providing imaged spectral light conditioned by the spectral transmission function, as conditioned multispectral image-bearing light. A lens 152 then directs the conditioned multispectral image-bearing light that has been conditioned by the spectral transmission function toward a sensor 154, a detector array. A control logic processor 156, such as a computer or type of dedicated microprocessor, for example, communicates with spatial light modulator 48 to control the spectral transmission function and obtains and processes image data from sensor 154 in order to provide output data 158, which may include image data for a two-dimensional image or other spectral data as described with reference to FIG. 1.

Figure 3:
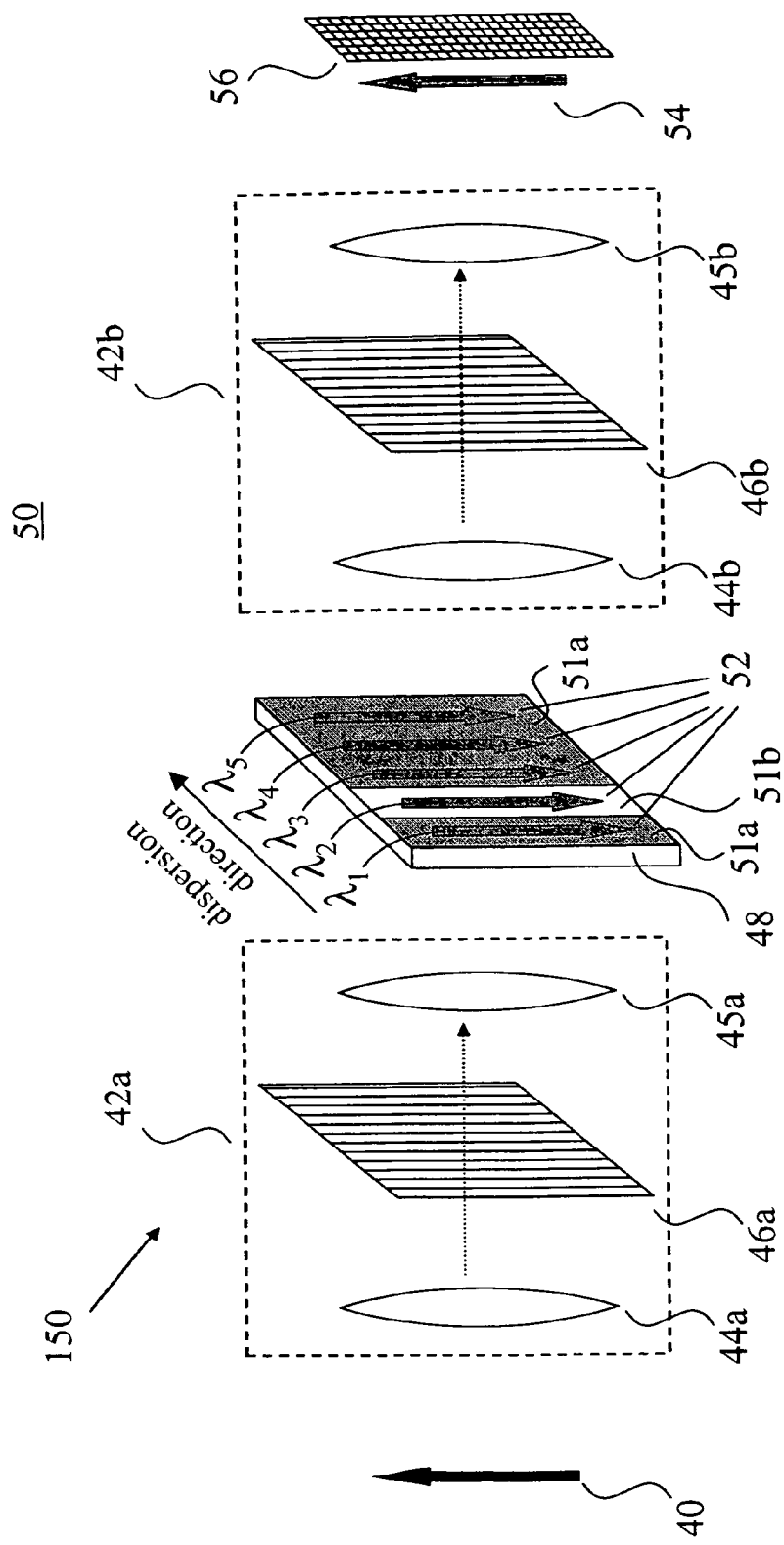
FIG. 3 is a block diagram showing functional architecture of a programmable spectral imaging apparatus.
Figure 4:
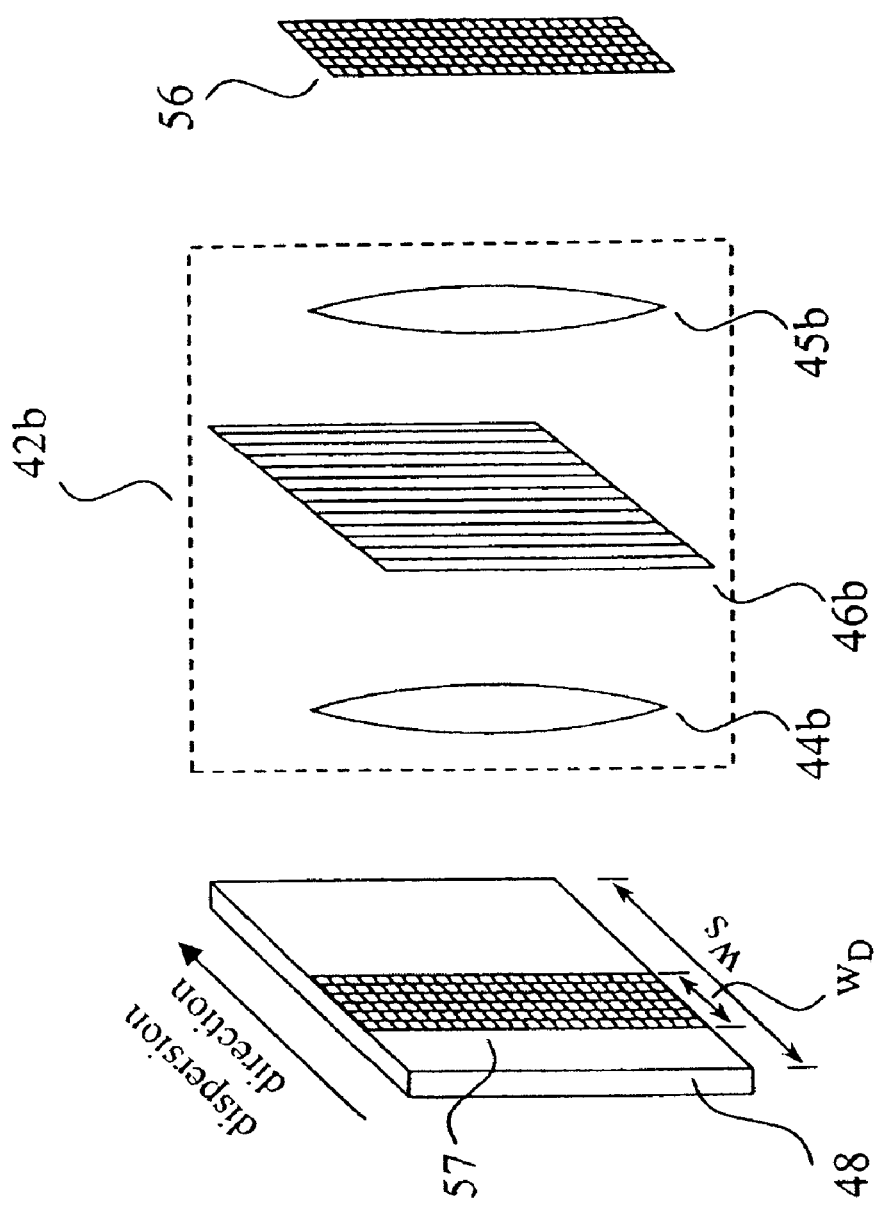
FIG. 4 is a block diagram showing a portion of the programmable spectral imaging apparatus of FIG. 3, with the projected image obtained.
Figure 5:
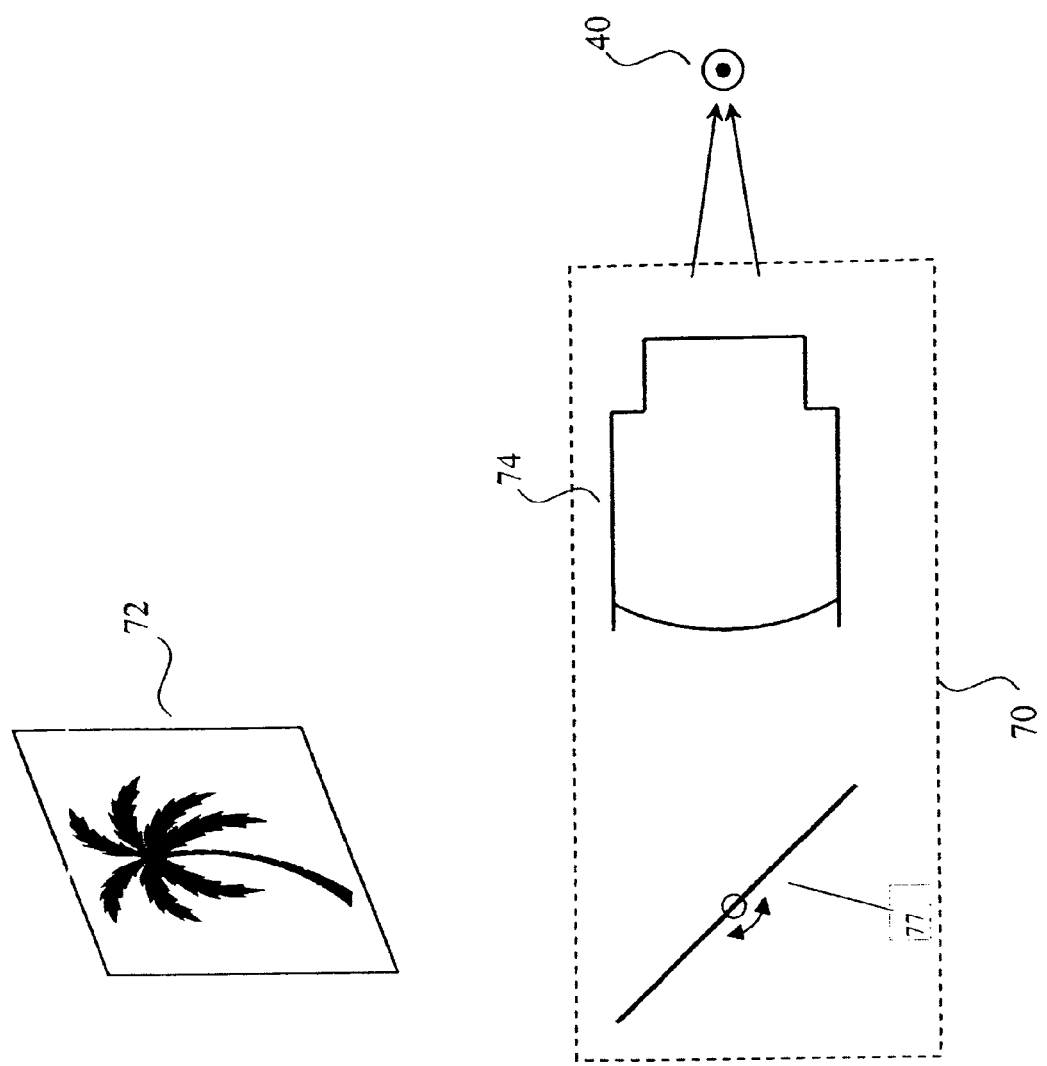
FIG. 5 is a block diagram showing scanning components for obtaining input light from an object.

FIGS. 3, 4, and 5 show the basic principles of a line-scanned programmable spectral imaging system 50 in a transmissive embodiment. A dispersive imaging subsystem 42a reimages spectral components of multi-wavelength image-bearing light from extended object 40, producing spectrally dispersed images 52 in an intermediate image plane. In FIG. 3, five distinct spectrally dispersed images 52 are shown, with wavelengths $\lambda_1$, $\lambda_2$, $\lambda_3$, $\lambda_4$, and $\lambda_5$. Typically, a continuous distribution of spectrally dispersed images 52 would be formed. The intermediate image plane contains a spatial light modulator 48 that, acting as the core component of programmable spectral filter 150, is controlled electronically to pass desired spectral bands through the system and to block unwanted spectral components, providing a spectral transmission function thereby. Unblocked spectral bands of image-bearing light are re-imaged by a de-dispersive imaging system 42b, providing a spectrally filtered output image 54 from conditioned multispectral image-bearing light on a detector array 56. Unshaded regions indicate unblocking operating states 51b that allow the corresponding spectral band component to be imaged. Shaded regions are blocking operating states 51a that prevent unwanted spectral components from reaching detector array 56.

In FIG. 3, dispersive imaging subsystem 42a contains lenses 44a and 45a and a transmission grating 46a. Lens 44a produces a Fourier transform of the input multi-wavelength image from extended object 40 near transmission grating 46a. This generates spectral dispersion by diffracting the various wavelengths at different angles. For a high-efficiency system, a blazed or holographic volume phase grating is preferred. As is well known to those skilled in the optical arts, dispersion could also be provided by other components, including prisms or reflection gratings. Lens 45a provides another Fourier transform, generating spectrally dispersed images 52. Dispersive and de-dispersive imaging subsystems 42a and 42b are similar in the embodiment of FIG. 3 and, as described subsequently, even use the same components in some embodiments. In de-dispersive imaging subsystem 42b, with lenses 44b and 45b, the function of transmission grating 46b is to remove the angular difference between various wavelengths. Spectrally filtered output image 54 is a conditioned image of the multi-wavelength image from extended object 40 with a programmable spectral transmission function determined by the operating states of the various regions on spatial light modulator 48.

Figure 9:
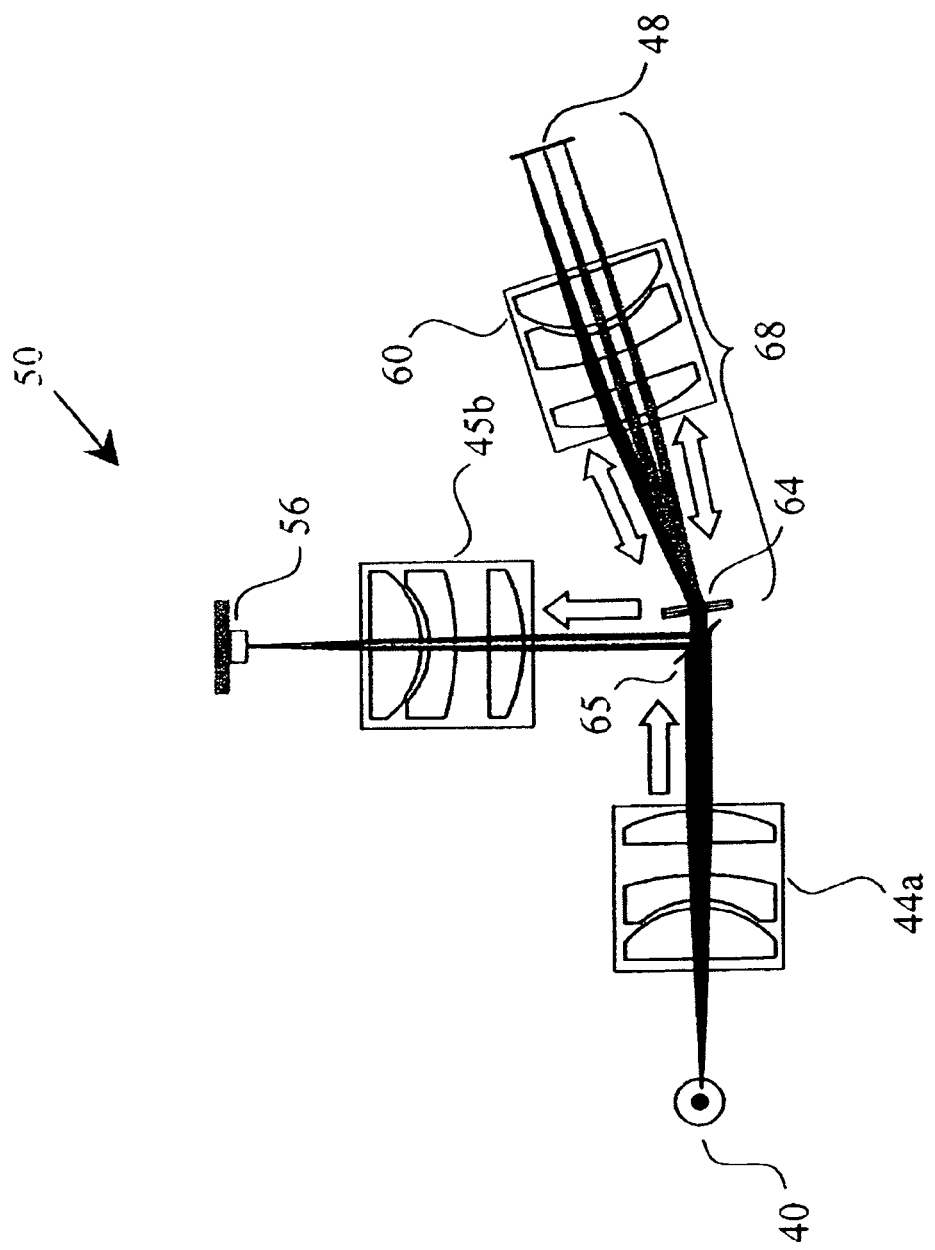
FIG. 9 is an embodiment of a spectral imaging apparatus with dispersive optical components for spectral separation.

The arrangement of FIG. 3 can be adapted to use a number of types of spatial light modulators 48 in programmable spectral filter 150. For example, with the addition of suitable polarizers and polarization conditioning components, the basic arrangement of FIG. 3 could be modified to use a transmissive LC panel as spatial light modulator 48. Other possible device types include Liquid Crystal On Silicon (LCOS) devices, DMD devices or similar micro-electromechanical reflective arrays, or diffractive spatial light modulators such as Grating Light Valve (GLV) or GEMS devices. The GEMS device, using an arrangement appropriately adapted from the light handling concepts exemplified in FIG. 3, has particular strengths when used as spatial light modulator 48. One embodiment of programmable spectral imaging system 50 for which the GEMS device is particularly well-suited is shown in FIG. 9 and described subsequently.

Programmable spectral imaging system 50 can be used to obtain spectral data from a wide range of objects, including living tissue or other materials. In order to image and discriminate the different spectral bands from extended object 40, it is necessary for spectrally dispersed images 52 to be sufficiently separated as they are distributed on spatial light modulator 48. Referring to FIG. 4, there is shown a portion of the spectral image directed to detector array 56 by spatial light modulator 48. For example, in order to capture a simple 3-band RGB (Red, Green, Blue) image of extended object 40, assuming that extended object 40 fills or very nearly fills detector array 56, certain conditions should be met. Width $W_D$, extending a portion of the width $W_s$ of spatial light modulator 48, should be less than approximately ⅓ of the width $W_s$ in the spectrally dispersed direction.

Referring to FIG. 5, there is shown a line-scanning configuration of a scanning subsystem 70 that could be used to obtain a multi-wavelength image of extended object 40, one or more lines at a time, for the embodiments of FIGS. 2 through 4. A scanning element 77 scans light from object 72 toward a lens 74, which forms the multi-wavelength image of extended object 40. It should be noted that the view in FIG. 5 appears as if rotated 90 degrees with respect to the view in FIG. 3. Scanning element 77 could be an oscillating galvanometer, a rotating prism or polygon, a MEMS-based mirror, or a rotating mirror, for example. As another alternative to scanning by scanning subsystem 70 in imaging apparatus 100, physical translation of the object being viewed relative to scanning subsystem 70 could be used as an alternative to scanning using scanning element 77.

Figure 6:
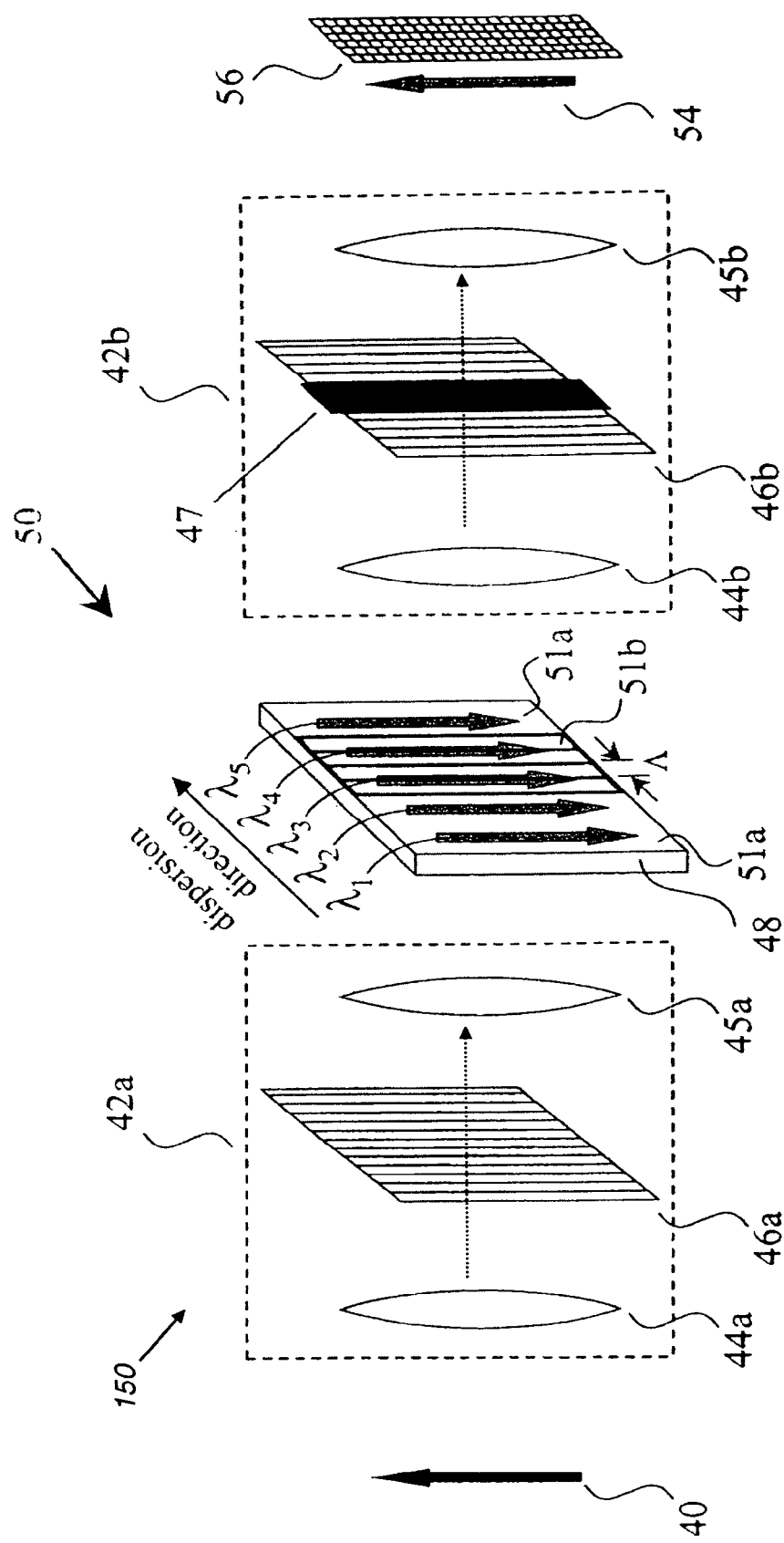
FIG. 6 is an embodiment of the present invention employing a diffractive grating and spatial light modulator.

Referring to FIG. 6, there is shown an embodiment of programmable spectral imaging system 50 using a type of spatial light modulator 48 that modulates light by switching between either of two states: a diffractive transmissive state with grating period Λ and a non-diffractive transmissive state. As shown in FIG. 6, grating period Λ is oriented parallel to the dispersion direction. In this configuration, spatial light modulator 48 could be, for example, an electro-optic or acousto-optic device. In the Fourier plane of de-dispersive imaging subsystem 42b, the $0^{th}$ (zeroeth) order undiffracted light is spatially separated from the diffracted light (orders ±1, ±2, ±3 . . . ). A stop 47 is used to block undiffracted light. Thus, in this configuration, the non-diffractive transmissive state corresponds to blocking operation state 51a of FIG. 3. The diffractive transmissive state corresponds to non-blocking operating state 51b in the FIG. 3 embodiment.

The arrangements of FIGS. 2, 3, 5, and 6 are advantaged in a number of ways over spectral imaging apparatus designs that utilize LCD or AO filters or those using Fabry-Perot tunable filters. The apparatus and methods of the present invention first spatially separate the spectral components of the light, distributing the spectral content using wavelength-distributing element 144 (FIG. 2) such as dispersive imaging system 42a (FIGS. 3, 5, and 6). Then, spatial light modulator 48 can be used as the programmable component of programmable spectral filter 150 to select one or more spectral portions or spectral bands of this light for direction toward detector array 56. The combination of a spatial spectral separator coupled with spatial light modulator 48 not only eliminates a number of problems common to conventional filters and filtering methods, but also provides additional capabilities that are beyond the reach of conventional filtering methods as well as those of filtering methods that employ tunable LCD filters, AO filters, or Fabry-Perot cavity filters. This includes the capability to provide a continuously variable transmission characteristic that is programmable, providing a programmable center wavelength and bandwidth. With a continuously variable transmission characteristic, the spectral transmission value, as a function of wavelength, can range from a value near zero to a predetermined maximum value. This value can be changed without corresponding substitution of components. Subsequent description gives detailed information on these additional capabilities.

Figure 8:
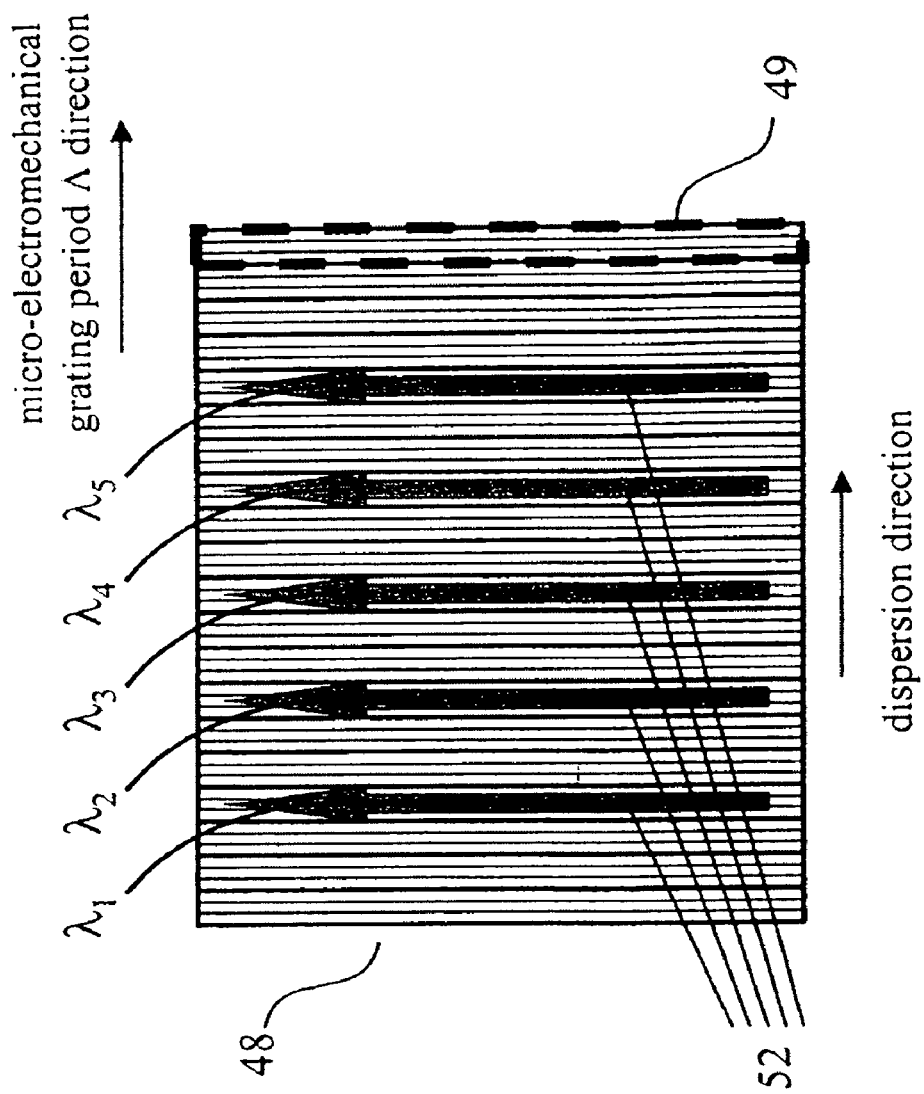
FIG. 8 is a plan view depicting spectrally dispersed images on a micro-electromechanical grating device.

As shown in FIG. 8, for simplified manufacture, the area of the micro-electromechanical grating device used for spatial light modulator 48 can be configured in a series of parallel modulator elements 49, each driven by its own input signal. The grating period A direction is preferably parallel to the dispersion direction. The addressable area of the micro-electromechanical grating device can be varied to effectively change the spectral resolution of the device. In the case of a GEMS device, each parallel modulator element 49 consists of multiple electromechanical ribbons that are electrically interconnected.

FIG. 9 illustrates an improved embodiment of programmable spectral imaging system 50 using a holographic volume phase grating 64 that has been shown to work well and provides very high diffraction efficiency over a relatively wide spectral range. In this embodiment, spatial light modulator 48 is a micro-electromechanical grating device, preferably a GEMS device. As was described with reference to FIG. 8, spatial light modulator 48 actuates the adjacent ribbon structures in various regions in order to generate both undiffracted zeroeth order light and diffracted light, according to the operating state.

Figure 10A:
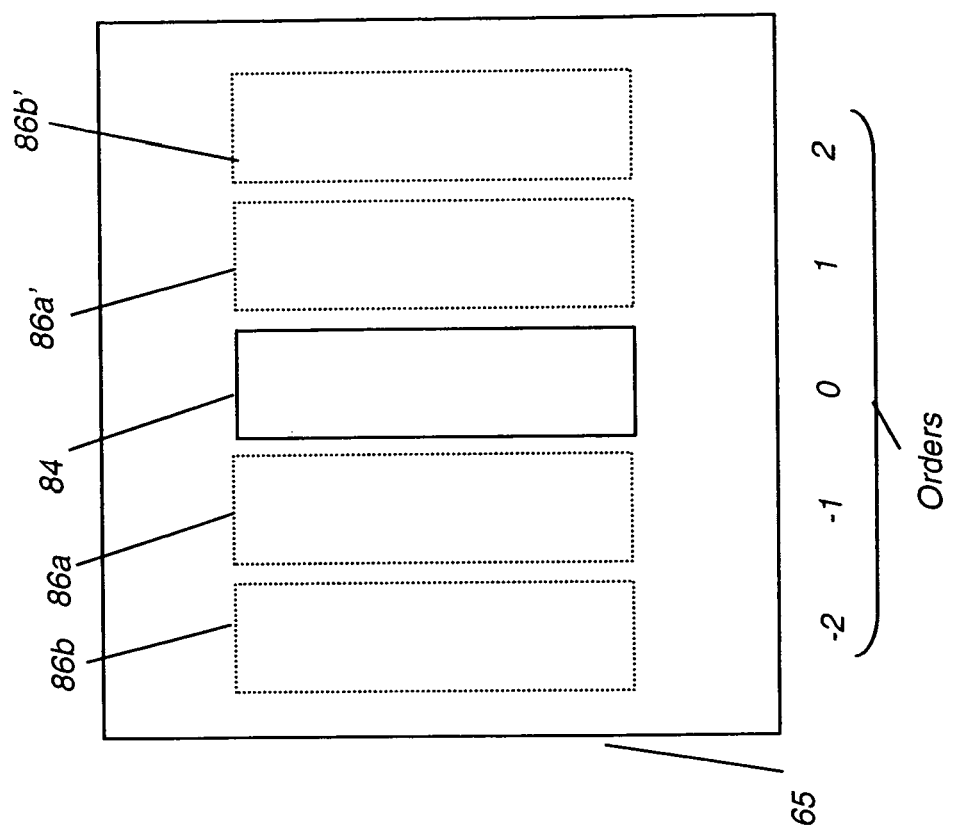
FIGS. 10A through 10C are plan views of a patterned mirror according to different embodiments of the present invention.

In the FIG. 9 embodiment, input imaging light from input multi-wavelength image 40 undergoes a Fourier transform by lens 44a and passes through an opening in a patterned mirror 65. As is shown in FIG. 10A, patterned mirror 65 has a transmissive region 84, with the bulk of patterned mirror 65 being reflective. The input imaging light is directed through a dispersive arm 68 that is used in double-pass configuration to perform dispersion, de-dispersion, and selection of spectral components of interest, employing some components in both directions of light travel. In dispersive arm 68, input wavelengths are dispersed by holographic volume phase grating 64. Lens 60 performs a Fourier transform on this light, providing spectrally dispersed images 52 to spatial light modulator 48 as described with reference to the general pattern of FIG. 3. The spectral transmission function that is determined by the operating state of the various regions of spatial light modulator 48 determines which spectral components are re-imaged onto detector array 56.

Light returning from spatial light modulator 48, consisting of at least one of the diffracted orders ( . . . −2, −1, +1, +2, . . . ) is off-axis with respect to the reflected zeroeth order light and is thus redirected by patterned mirror 65 or other type of light path selector. This returning light conditioned by modulation at GEMS spatial light modulator 48 undergoes a Fourier transform by lens 60 and is de-dispersed at holographic volume phase grating 64. The selected spectral components of this conditioned multispectral image-bearing light are reflected toward detector 56 by reflective portions of patterned mirror 65. Lens 45b performs a Fourier transform on this reflected light as it directs the light to detector 56.

In the embodiment shown in FIG. 9, lenses 44a, 45b, and 60 can have the same focal lengths and thus provide unity magnification between the input image, images formed on spatial light modulator 48, and the image formed on image sensor 56. However, it will be apparent to one skilled in the imaging arts that programmable spectral imaging system 50 could alternately have non-unity magnification, or even anamorphic magnification between any of the image planes. For example, it would be possible to alter the magnification of lens 45b in order to provide anamorphic magnification at image sensor 56 or in order to change the f/# of imaging optics for forming an image at image sensor 56.

Patterned mirror 65 is preferably located near the common Fourier transform planes of lenses 44a, 60, and 45b. The design of patterned mirror 65, or an equivalent light path selector, depends on the type of spatial light modulator 48 that is employed for spectral switching. When using a GEMS device as a spectral switch, patterned mirror 65 can have the basic arrangement shown in FIG. 10A (not to scale). A central transmissive region 84 transmits the zeroeth order reflected light through patterned mirror 65. Diffracted orders are incident on patterned mirror 65 as shown by dotted areas 86b, 86a, 86a', and 86b' which correspond to respective diffracted orders −2, −1, 1, and 2 in the embodiment shown. Of course, with the GEMS architecture, fewer or more diffracted orders could be reflected from patterned mirror 65 as desired. A cross-order and cleanup filter (not shown) can be provided in the embodiment of FIG. 9 to block any residual reflected light from the imaging path.

Figure 10B:
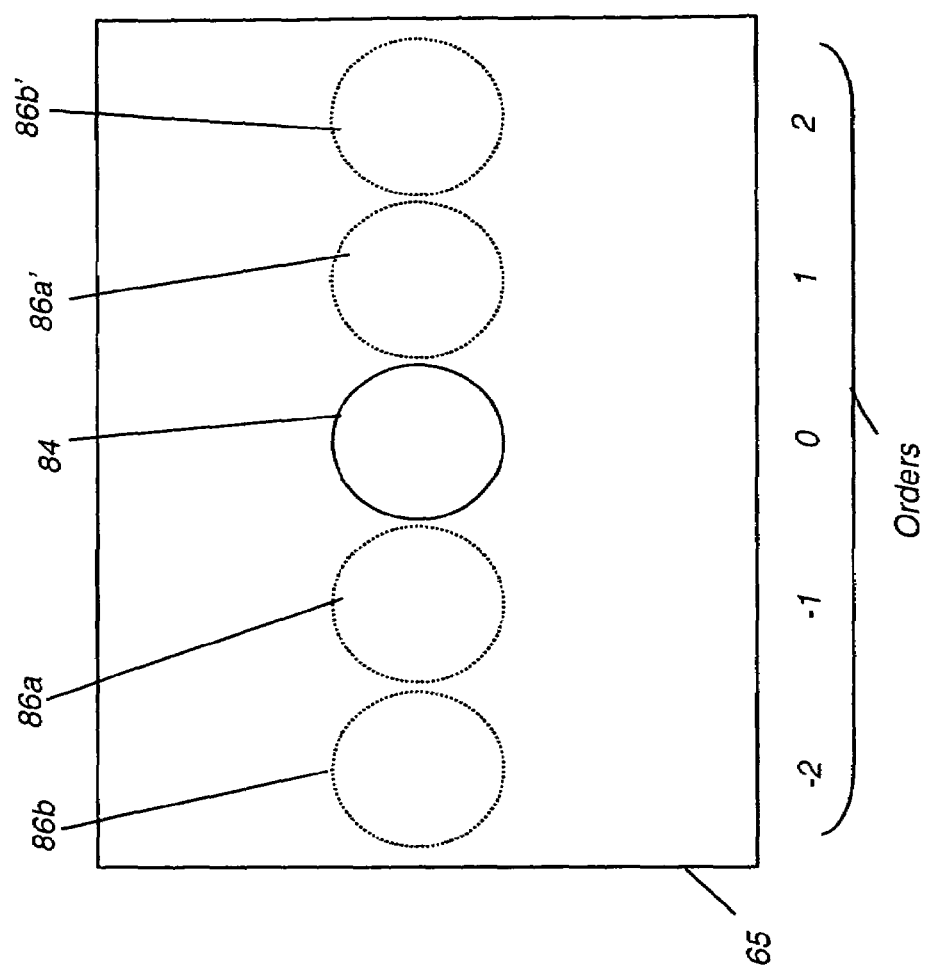
Figure 10C:
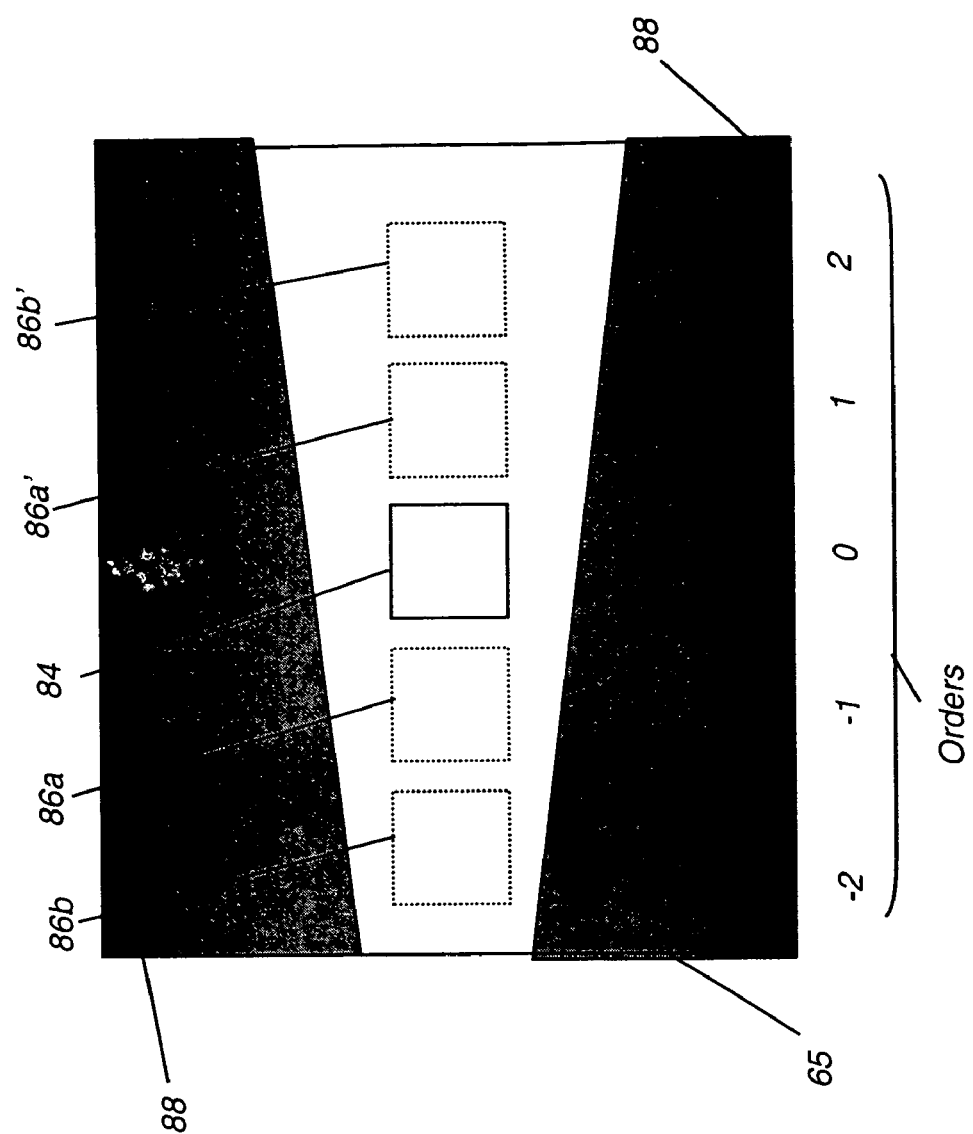

While FIG. 10A shows a rectangular shape for window 84 and for areas 86a, 86b, 86a', and 86b', in practice, this shape can cause unequal f/# and MTF (Modulation Transfer Function) characteristics between horizontal and vertical axes. In order to provide more equal f/# along both axes, a circular opening for window 84 is preferred, as shown in the example of FIG. 10B (not to scale). Other modifications to patterned mirror 65 are also possible and may be advantageous, as shown in FIG. 10C (again, not to scale). Here, window 84 and areas 86a, 86b, 86a', and 86b' are square and the surface of patterned mirror 65 is treated so that it is not fully reflective. Instead, opaque areas 88 are formed on patterned mirror 65 for absorbing cross-order light and blocking unwanted stray light from the imaging light path of modulated spectral band light 96. Additional windows 84 may also be provided in patterned mirror 65 as needed.

The behavior of GEMS devices is described in considerable detail in commonly assigned U.S. Pat. No. 6,307,663, described above; in commonly assigned U.S. Pat. No. 6,411,425 entitled "Electromechanical Grating Display System With Spatially Separated Light Beams"; and in commonly assigned U.S. Pat. No. 6,678,085 entitled "High-Contrast Display System With Scanned Conformal Grating Device" all to Kowarz et al., the applicable parts of which are herein incorporated by reference.

Detector array 56 or image sensor 154 can be a device of one of a number of types, including a linear detector array, a multi-linear array, a time-delayed integration (TDI) linear array, or an area array. For visible and near-IR wavelengths, the preferred type of detector array is a Charge-Coupled Device (CCD) or Complementary Metal Oxide Semiconductor (CMOS) device, components similar to those commonly used in digital cameras, document scanners, and other imaging equipment. When programmable spectral imaging system 50 is configured in a line-scanned mode such as for use in a low-signal environment, the image sensor or array is preferably a time-delayed integration linear array. This time-delayed integration is then coordinated and temporally synchronized with line scanning.

Systems Using Dichroic Separation

Figure 7:
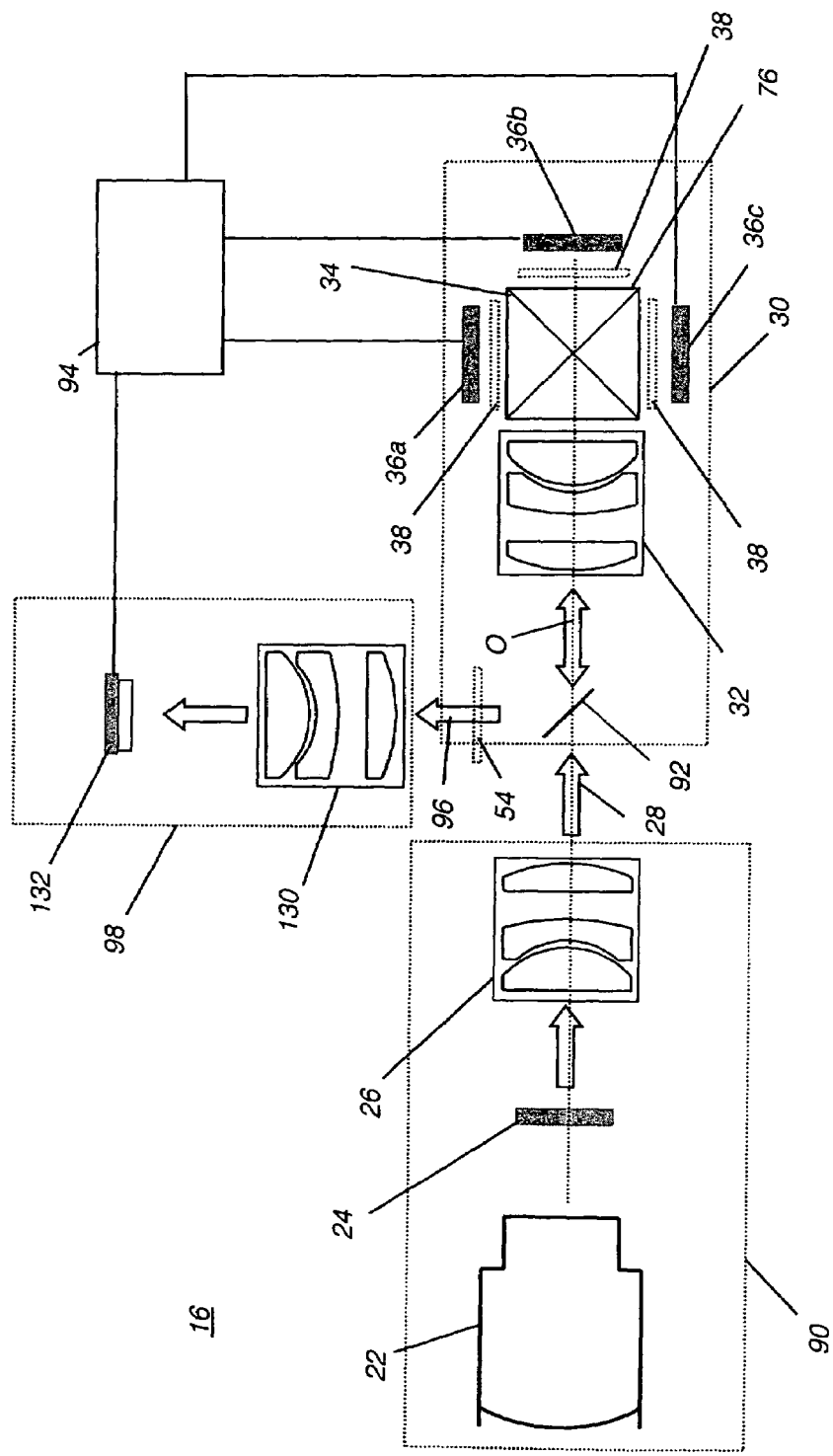
FIG. 7 is an embodiment in a configuration using dichroic surfaces for separation of spectral components.

Referring to FIG. 7, there is shown an alternate embodiment of spectral imager 16 that uses dichroic filters as wavelength distributing elements. An input optics section 90, having forward optics 22 and a lens 26, directs an incident multispectral image bearing light 28 to a spectral switching section 30. Within spectral switching section 30, a patterned mirror 92 or other light path selector structure passes multispectral image bearing light 28 along an optical axis O toward a lens 32. Lens 32 then directs multispectral image bearing light 28 to a dichroic separator 34. Dichroic separator 34 performs its wavelength distribution function by separating multispectral image bearing light 28 into two or more spectral bands, each spectral band having a bandwidth defined by a range of continuous, defined wavelengths. Each spectral band is directed to one of a number of optical switches 36a, 36b, 36c. Each optical switch 36a, 36b, 36c is switched by a control logic processor 94 to redirect its corresponding spectral band, as a modulated spectral band light 96 back toward patterned mirror 92. Patterned mirror 92, serving as a light path selector, redirects modulated spectral band light 96 to an image forming section 98. Image forming section 98 has a lens 130 that directs the incident modulated spectral band light 96 to an image sensor 132. Image sensor 132 then provides image data corresponding to the intensity of modulated spectral band light 96 that is received.

In input optics section 90, forward optics 22 typically has a number of lenses or mirrors that collect the light from the object field. In the embodiment shown in FIG. 7, forward optics 22 forms an intermediate image 24 as an object of lens 26. Lens 26 may be a single lens or may be a more complex lens assembly.

In the embodiment of FIG. 7, spectral switching section 30 employs GEMS devices as optical switches 36a, 36b, and 36c. Following the traditional color imaging model, optical switches 36a, 36b, and 36c switch light in red, green, and blue wavelengths, respectively; of course, alternate wavelengths of light could be switched in spectral switching section 30. Each optical switch 36a, 36b, 36c may be provided with an optional clean-up filter 38 that may be an absorption filter or dichroic filter, for example. Control logic processor 94 switches one of optical switches 36a, 36b, and 36c at a time, to redirect one wavelength band of light as modulated spectral band light 96.

In the embodiment of FIG. 7, dichroic separator 34 is an X-cube. Familiar to those skilled in the electronic color imaging arts, the X-cube consists of a crossed pair of dichroic surfaces that selectively reflect red and blue light components and transmit the green light component in conventional configurations. When configured as GEMS devices, each optical switch 36a, 36b, and 36c either reflects or diffracts the incident spectral band. Reflected light, or zeroeth order light, travels back along the optical axis O toward input optics section 90. Imaging light, consisting of at least one of the diffracted orders ( . . . −2, −1, 1, 2, . . . ) is off-axis with respect to the reflected zeroeth order light and is thus redirected by patterned mirror 92 or other type of light path selector.

In the embodiment shown in FIG. 7, lenses 26, 32, and 130 have the same focal lengths and thus provide unity magnification between the input image, images formed on optical switches 36a, 36b, and 36c, and the image formed on image sensor 132. However, it will be apparent to one skilled in the imaging arts that spectral imager 16 could alternately have non-unity magnification, or even anamorphic magnification between any of the image planes. For example, it would be possible to alter the magnification of lens 130 in order to provide anamorphic magnification at image sensor 132 or in order to change the f/# of imaging optics for forming an image at image sensor 132.

While the X-cube provides one type of solution for color separation, there are a number of alternative embodiments that may perform the function of dichroic separator 34 in an improved manner. As shown in FIG. 7, dichroic separator 34 accepts multispectral image bearing light 28 and separates it into its spectral bands. Dichroic separator 34 also combines modulated spectral band light 96 from each of the optical switches. As is well known in the imaging arts, there are various arrangements of dichroic elements such as dichroic plates that could be used as alternatives to the X-cube. As still another alternative, a Philips prism could also serve as an alternative for dichroic separator 34. These alternate configurations may be less polarization sensitive and less likely to exhibit the mid-field discontinuity that is often characteristic of the X-cube.

Image sensor 132 can be a device of one of a number of types, including a linear detector array, a multi-linear array, a time-delayed integration (TDI) linear array, or an area array. For visible and near-IR wavelengths, the preferred type of detector array is a Charge-Coupled Device (CCD) or Complementary Metal Oxide Semiconductor (CMOS) device, components similar to those commonly used in digital cameras, document scanners, and other imaging equipment. When spectral imager 16 is configured in a line-scanned mode for use in a low-signal environment, the image sensor 132 array is preferably a time-delayed integration linear array using off-chip processing to effect time-delayed integration. This time-delayed integration is then coordinated and temporally synchronized with line scanning.

Referring back to FIG. 7, patterned mirror 92 is preferably located near the common Fourier transform planes of lenses 26, 32, and 130. As was described with reference to patterned mirror 65 in FIGS. 10A, 10B, and 10C, the design of patterned mirror 92, or an equivalent light path selector, depends on the type of light modulator that is employed for spectral switching.

The basic arrangement shown in FIG. 7 can be adapted to a number of alternate embodiments, with additional wavelength bands provided, so that modulated spectral band light 96 may be any of four, five, or six spectral bands respectively. Dichroic separator 34 in spectral switching section 30 can be more complex than is shown in the FIG. 7 embodiment, having multiple dichroic sections, for example, each acting as a dichroic beamsplitter. Dichroic filters can be used in various combinations to obtain many types of spectral transmission functions for spectral imaging.

Referring back to the basic model of FIG. 2, it can be observed that the general function of wavelength-distributing element 144 can be performed either using dispersion (such as employing a grating or prism) or using dichroic surfaces. Both of these wavelength-separation approaches provide spatial distribution for multispectral image bearing light 28, splitting up the light into a set of three or more desired spectral components for modulation, recombination, and sensing. The use of one or more spatial light modulators as programmable optical switches 36a, 36b, 36c or as the programmable component of programmable spectral filter 150 enables the selection and conditioning of those spectral components of the light from extended object 40 that are of particular interest in an application. As noted earlier in the background section, this feature offers advantages for spectral imaging in a number of different applications, including medical diagnostics and industrial inspection, for example.

It is instructive to note that with both dispersive embodiments as shown in FIG. 9 and dichroic separation embodiments as shown in FIG. 7, the present invention allows a compact arrangement of components, with re-use of one or more of the same components for light traveling in opposite directions. In the dispersive distribution embodiment of FIG. 9, a single component, phase grating 64, provides both wavelength distribution (dispersion) and subsequent recombination (de-dispersion). In analogous fashion, the dichroic separation embodiment of FIG. 7 employs a single component, dichroic separator 34 such as the X-cube shown, to provide both wavelength distribution (separation) and recombination. In the programmable spectral filter embodiments of FIGS. 7 and 9, both the un-modulated multispectral image-bearing light and the modulated spectral bands of image-bearing light that form the conditioned multispectral image-bearing light, headed in opposite directions, follow the same parallel path over at least some portion of spectral switching section 30 or arm 68, respectively. Even in the straight-through embodiments of FIGS. 3 and 6, the paths of unmodulated multispectral image-bearing light and conditioned multispectral image-bearing light are parallel, running in the same direction. Thus, each of the various embodiments of the present invention allow the design of programmable spectral imaging system 50 to economize on space requirements.

The programmable spectral imaging system 50 also provides excellent imaging performance because of the on-axis optical layout of the programmable spectral filter section. Specifically, in the aforementioned embodiments, the input spatially distributed image-bearing light that emerges from the wavelength distributing element (grating, prism or dichroic) is substantially parallel to the output modulated spectral bands that have been modulated by the spatial light modulator, when in close proximity to the spatial light modulator. This arrangement results in very low optical aberrations.

Controlling Spectral Transmission Function Characteristics

The programmable aspects of the apparatus and method of the present invention provide more than merely a substitute method for conventional tunable filters such as LCD tunable filters, AO filters, or Fabry-Perot cavity filters. Instead, the apparatus and methods of the present invention, by taking advantage of spatial light modulator capabilities including programmability, high response speeds, and high contrast, are able to provide an unprecedented degree of programmable control over a range of filter characteristics, providing a spectral transmission function that can be programmed to be ideally suited to an application. In particular, the embodiments using dispersive components for light separation, as in FIGS. 3 and 9, enable considerable flexibility for a highly programmable filter design, including continuously variable transmission over a range of wavelengths. Among the spectral transmission characteristics that can be programmably controlled using the dispersive embodiments of the present invention are the following:

(i) wavelength of one or more filter passbands, usually specified using the center frequency of the passband;
(ii) number of wavelength bands transmitted, allowing multiple discrete wavelength bands to be provided at the same time;
(iii) bandwidth of passbands; and
(iv) characteristic shape of the spectral transmission function, controlling transmittance at each wavelength within a passband, effectively providing continuously variable transmission over a selected range of wavelengths.

Figure 18:
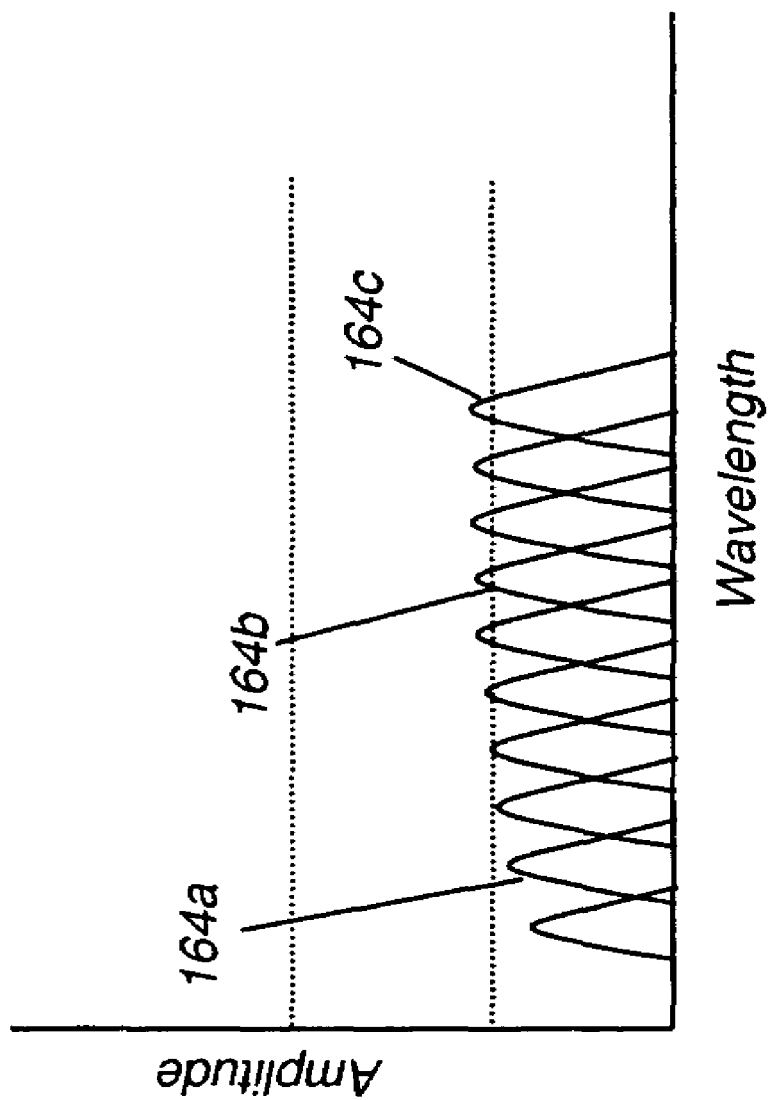
FIG. 18 is a graph showing tunable filter response at a number of different wavelengths.

FIG. 18 shows a set of characteristic spectral transmission curves for conventional tuned LCD filters. For one conventional tuned LCD filter design, the filter can be tuned to match any single curve from this set, one curve at a time. As this Figure shows, filter characteristics can be varied by center wavelength, so that an LCD filter can be tuned to a single center wavelength over some range of wavelengths. By way of reference, three example transmittance curves 164a, 164b, and 164c are called out in this Figure. Unfortunately, with conventional devices, there is some inherent variation in amplitude, as shown in FIG. 18, over the range of center wavelengths. Significantly, although the center frequency can be specified, there is no capability to program the filter bandwidth using these devices. While there may be some capability for a filter characteristic to have two passbands using a cascaded combination of conventional LCD filter devices, the relative separation of these passbands is fixed for the design; there is very little flexibility in controlling filter characteristics other than center frequencies for a single passband. Thus, it can be seen that the spectral transmission function provided according to the present invention is much more versatile and flexible than are the relatively constrained filter characteristics obtainable using conventional tuned LCD filters or similar devices.

Figure 11A:
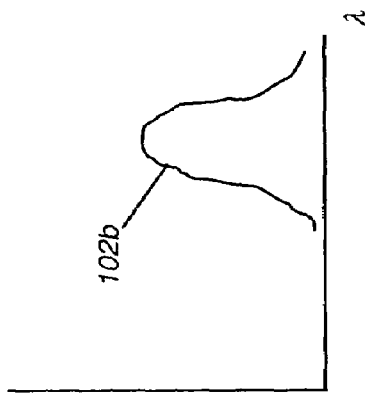
FIGS. 11A, 11B, 11C, and 11D are graphs showing exemplary tuned filter transmission characteristics at different wavelengths.
Figure 11B:
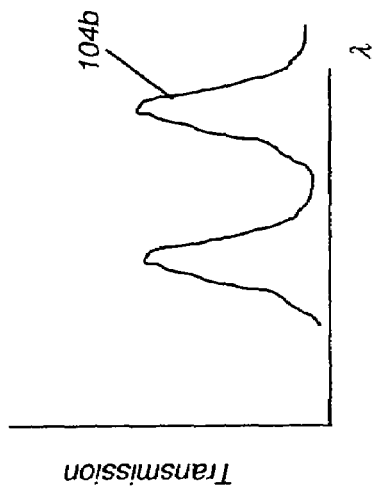

Referring now to FIGS. 11A and 11B, there are shown curves 102a and 102b that have the same shape but are shifted in terms of center frequency. The apparatus and method of the present invention can form a programmable filter that enables the center wavelength of a single transmission passband to be modified, as shown in curves 102a and 102b. This effect can be obtained, for example, using the arrangements of FIGS. 3 and 9. Here, spatial light modulator 48 can be programmed to select the wavelengths of interest from the dispersed light received from grating 46a or other type of dispersive wavelength-distributing element 144 (FIG. 2). This effect could also be obtained using spectral imager 16 of FIG. 7, by selecting suitable dichroic components of X-cube 76 or other dichroic wavelength separating element.

Figure 11C:
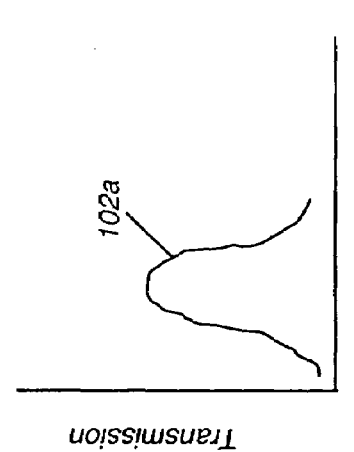
Figure 11D:
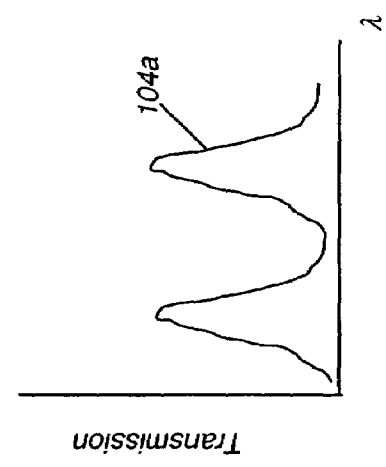
Figure 12:
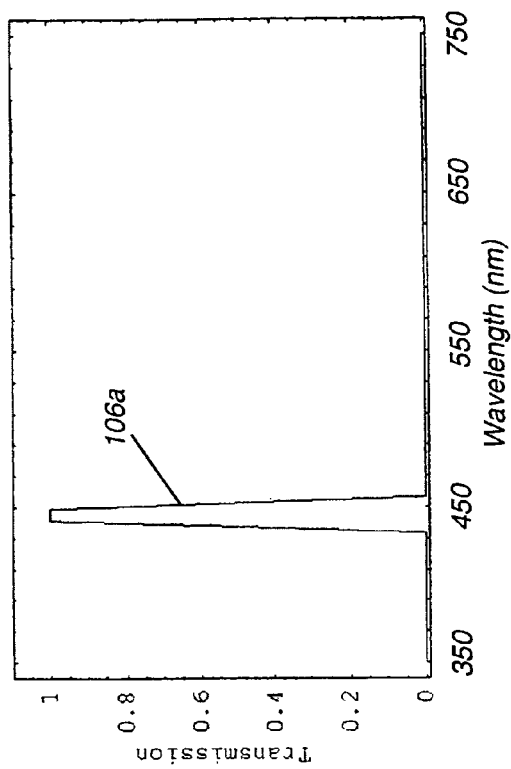
FIG. 12 is a graph showing transmission characteristics for conventional blue light in one embodiment.
Figure 13:
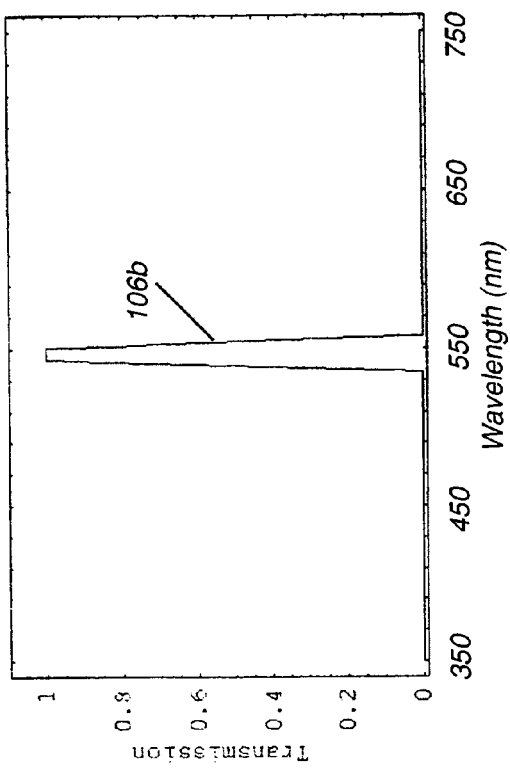
FIG. 13 is a graph showing transmission characteristics for conventional green light in one embodiment.
Figure 14:
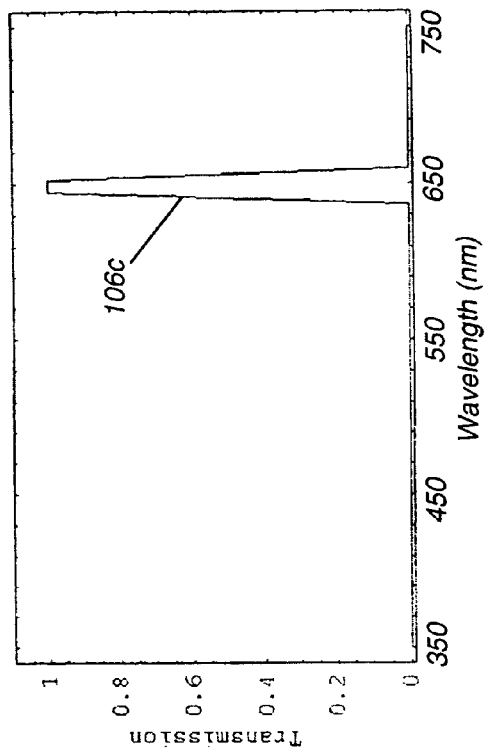
FIG. 14 is a graph showing transmission characteristics for conventional red light in one embodiment.
Figure 15:
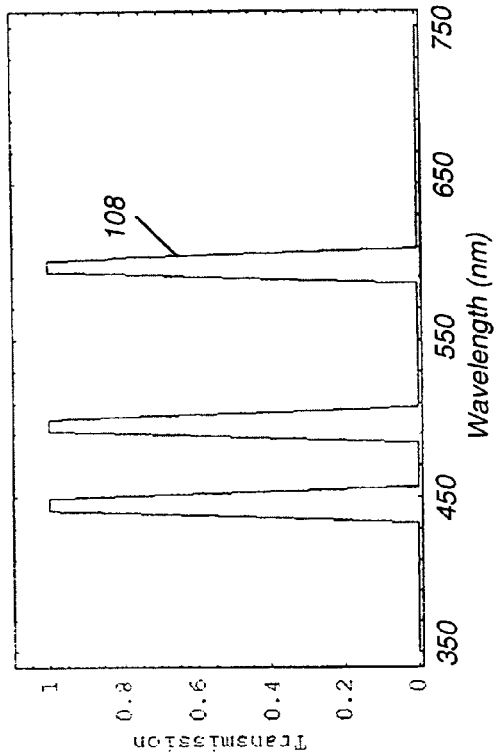
FIG. 15 is a graph showing spectral transmission characteristics for capturing multiple wavelength bands at the same time.

Referring to FIGS. 11C and 11D, curves 104a and 104b show two transmission passbands that are shifted between different wavelength settings. In FIGS. 12, 13, and 14, curves 106a, 106b, and 106c show programmable filter response at different visible wavelengths. FIG. 15 shows a curve 108 with multiple transmission wavelengths. Each of these characteristic curves can be obtained using the apparatus of the present invention.

The spectral transmission functions of curves shown in FIGS. 11A, 11B, 12, 13, and 14 are fairly straightforward, showing filters with single passbands having center wavelengths shifted to the appropriate value. Providing this function is within the capability of conventional tunable filters, such as the LCD, acousto-optical, and Fabry-Perot tunable filters noted earlier.

By comparison, the spectral transmission functions of curves shown in FIGS. 11C, 11D, and 15 are more complex, having multiple passbands at different center frequencies. Providing this function may be possible with conventional devices, but with significant constraints, and is certainly much more difficult using conventional tunable filters, such as the LCD, acousto-optical, and Fabry-Perot tunable filters.

It must be noted that the apparatus and methods of the present invention, based on the model systems shown in FIGS. 3, 6 and 9, provide the capability for implementing any of the spectral transmission functions of FIGS. 11A, 11B, 11C, 11D, 12, 13, 14, and 15 (that is, capabilities listed in (i) and (ii) above). Moreover, the apparatus and methods of the present invention permit rapid changing between any of the spectral transmission functions shown in these figures, providing a fully programmable solution for spectral filtering.

In addition to allowing the single and multiple bandwidth filter responses of FIGS. 11A through 15, the method and apparatus of the present invention also allow a more flexibly programmable capability for providing spectral transmission functions of an analog nature, effectively providing a continuously variable transmission characteristic. FIGS. 16A through 16F show spectral transmission functions that can be obtained using the apparatus and method of the present invention. It must be observed that the spectral transmission functions of FIGS. 16A through 16F are either not obtainable using conventional tunable filters or would be extremely challenging to implement in any form with LCD, acousto-optical, and Fabry-Perot tunable filter technologies. Even where conventional approaches could be devised to obtain the curves of FIGS. 16A through 16F in a single instance, it would not be feasible to programmably change from one characteristic curve, for example that of FIG. 16C, to another, for example that of FIG. 16D without considerable rework or even replacement of individual components. The apparatus of the present invention allows this type of change simply in response to programmed instructions.

Figure 16A:
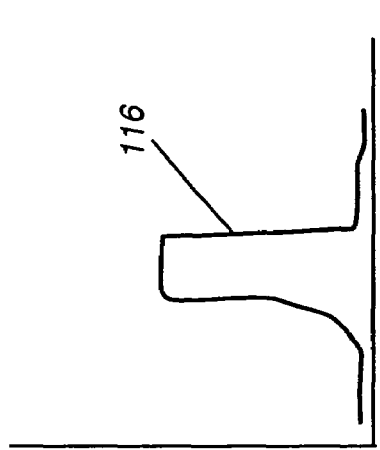
FIG. 16A is a graph showing adjustment of the tunable filter bandwidth obtained according to the present invention.

Referring to FIG. 16A, there is shown a spectral transmission curve 110 for transmission from programmable spectral filter 150. As the dotted line of curve 112 shows, the response bandwidth for curve 110 can be varied when using spatial light modulator 48 with the embodiments of FIGS. 3, 6, or 9. Here, curve 112 exhibits a narrower bandwidth than curve 110; this bandwidth would be programmably adjustable over a range. Thus, the same programmable spectral filter 150 that provides curve 110 could be instructed to narrow the passband to that of curve 112, by a command from control logic processor 156 (FIG. 2). As shown and described with respect to FIGS. 3, 4, 6, and 8, the bandwidth of the spectrally dispersed light that impinges on spatial light modulator 48 can be modified by enabling a variable portion of the spatial light modulator 48 elements.

Figure 16B:
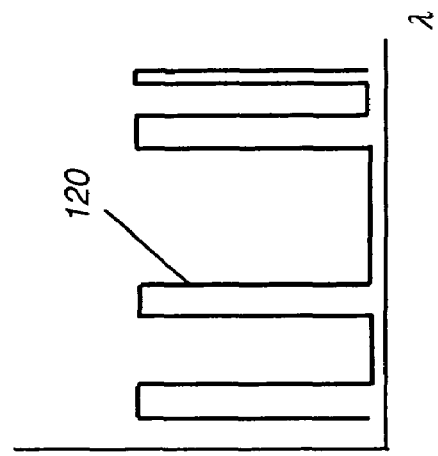
FIG. 16B is a graph showing multiple transmission bands using a tunable filter according to the present invention.

Referring to FIG. 16B, there is shown a spectral transmission curve 114 for programmable spectral filter 150 under a different set of actuation instructions to spatial light modulator 48. Over the range of wavelengths shown, programmable spectral filter 150 has two passbands, whose width and shape vary from each other. Amplitude could also be varied by modulating spatial light modulator 48 using pulse-width modulation, amplitude modulation, or some other suitable modulation scheme.

Figure 16C:
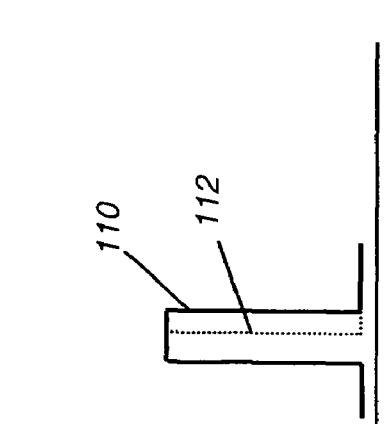
FIG. 16C is a graph showing variable filter response for a continuously variable transmission function obtained using a tunable filter.
Figure 16D:
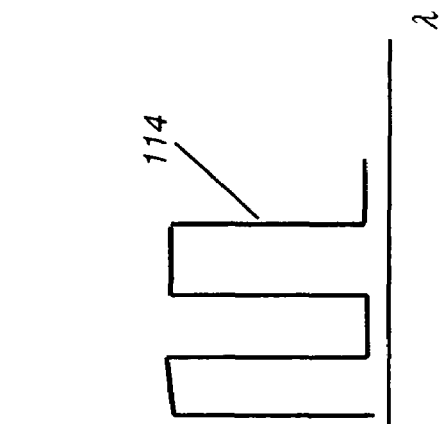
FIG. 16D is a graph showing multiple transmission bands obtained using a tunable filter.
Figure 16F:
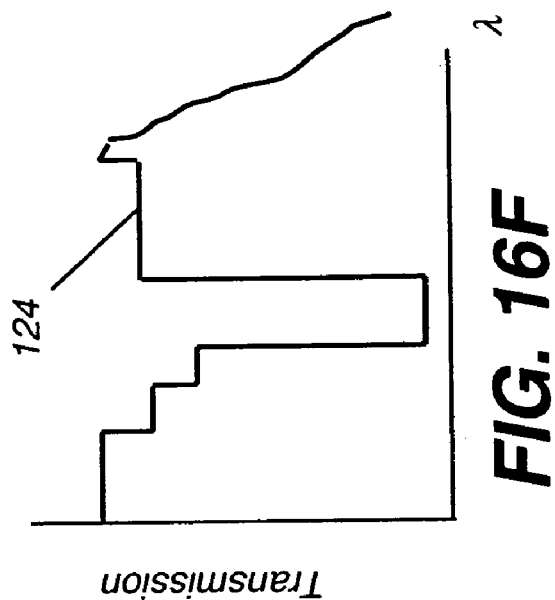
FIG. 16F is a graph showing a stepped response characteristic for a programmable tunable filter for a continuously variable transmission function according to the present invention.
Figure 16E:
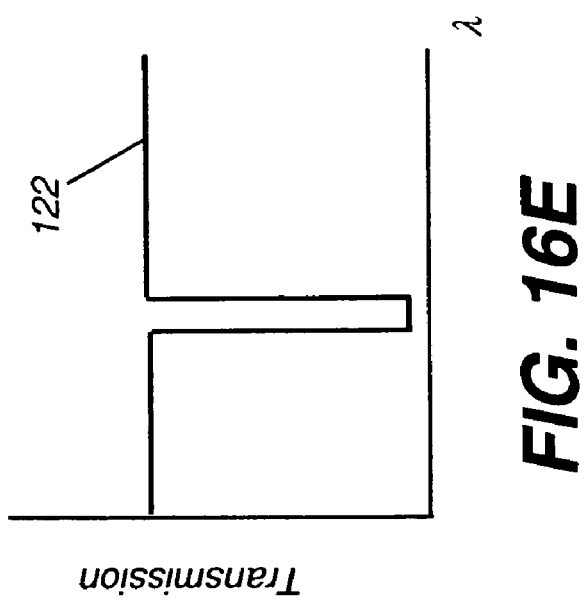
FIG. 16E is a graph showing a tunable filter response for obtaining a notch filter.

FIG. 16C shows a spectral transmission curve 116 having different slopes on either side of its passband. This effect could be achieved by selectively modulating the corresponding portion of spatial light modulator 48 for each range of wavelengths. Referring to FIG. 16D, a curve 120 shows a spectral transmission characteristic with multiple narrow passbands. It can be appreciated that this characteristic response would be very challenging to generate using conventional, cascaded LCD filters, and that it would be extremely challenging to implement a system that enabled a programmable change from such a filter response to some other characteristic response, such as those shown in FIGS. 16A-16C or 16E-16F. FIG. 16E shows a spectral transmission curve 122 for a notch filter. FIG. 16F shows a spectral transmission curve 124 having a distinctive shape, with "step" patterns, a sloped response portion, and a notched response portion. Again, unlike conventional tunable filter devices, programmable spectral filter 150 of the present invention is capable of providing a programmable spectral transmission function, varying any or all of characteristics (i) through (iv) listed above and switching programmably from one type of characteristic curve to another.

When using a GEMS spatial light modulator 48, very high switching speeds allow modulation over any portion of the spatially distributed wavelengths and allow fast switching between one set of characteristic spectral transmission curves and another. As described in the '663 Kowarz et al. patent cited earlier, GEMS design allows any number of elongated ribbon elements to be incorporated in a device and permits a wide range of ribbon element lengths, with any suitable number of intermediate supports provided for each ribbon and with any number of adjacent ribbons electrically coupled to act in unison. This inherent flexibility allows the GEMS device to be scaled so that each individual addressable active area can have an optimal size for its application. Addressable areas using GEMS devices can vary significantly in size. In some cases, an addressable area well in excess of 1 cm$^2$ could be obtained, with a very high fill factor. To size a GEMS device appropriately for a particular application requires selection of suitable ribbon lengths, of support structures and dimensions, and of other known parameters, as would be apparent to one skilled in the micromechanical fabrication arts. Current GEMS designs are digital and employ pulse-width modulation. Because the integration time of image sensors vastly exceeds the switching times of GEMS devices, continuously variable transmission can be effectively achieved by using a "time averaged" pulse-width modulation sequence, using timing techniques familiar to those in the electronic arts. This type of variable transmission could be used, for example, for shaping the spectral transmission curves as shown in the examples of FIGS. 16A-16F. In contrast to LCD tunable filter devices, AO controllable devices, and Fabry-Perot cavity filter devices, the GEMS device is resilient under temperature, capable of very short response times, and offers high contrast levels.

FIG. 20 is a flowchart of another process describing an alternative mode of operation for the programmable spectral imaging system. Again, a user takes advantage of the high degree of programmability of the programmable spectral filter 150 to modify the spectral transmission function. For this discussion, we also assume a medical use scenario, although many other analyses are clearly possible. This scenario is used to illustrate the use of this system and does not necessarily indicate the only or preferred application. Initially, the user inputs a definition of a target spectrum; the user, say for example, a medical practitioner, has a first best assumption for a particular disease condition to be diagnosed. This disease condition has associated with it a particular target spectrum that would indicate to the user the presence of this disease condition. The user could input this target spectrum by selecting from a preexisting list of disease conditions, or their associated spectra, stored in the system or accessible in some other manner to the user. The system projects light of a suitable set of wavelengths onto the object under test and collects light form the object. The multispectral image bearing light from the object is conditioned by the programmable spectral filter 150 of the system to affect the appropriate transmission of multispectral image bearing light onto the detector array. The system performs a comparison of the array detector signals to the target spectrum to determine the likelihood of the presence of the disease condition. There are many methods for performing this comparison, well known to those skilled in spectral analysis. If the comparison is favorable, the process is complete with the user having concluded that the object has in fact the disease condition. If the comparison is unfavorable, then the system has the option to alter the spectral transmission function of the programmable spectral filter 150 to affect a different analysis. The ease of programmability of the programmable spectral filter 150 facilitates making this change rapidly. The entire process repeats until the system is satisfied with the results of the analysis. Typically the process repeats until the difference between the analyzed data and the target spectral data is smaller than some threshold value indicating a certain acceptable probability of error for the analysis.

Progammable Light Source

Figure 17:
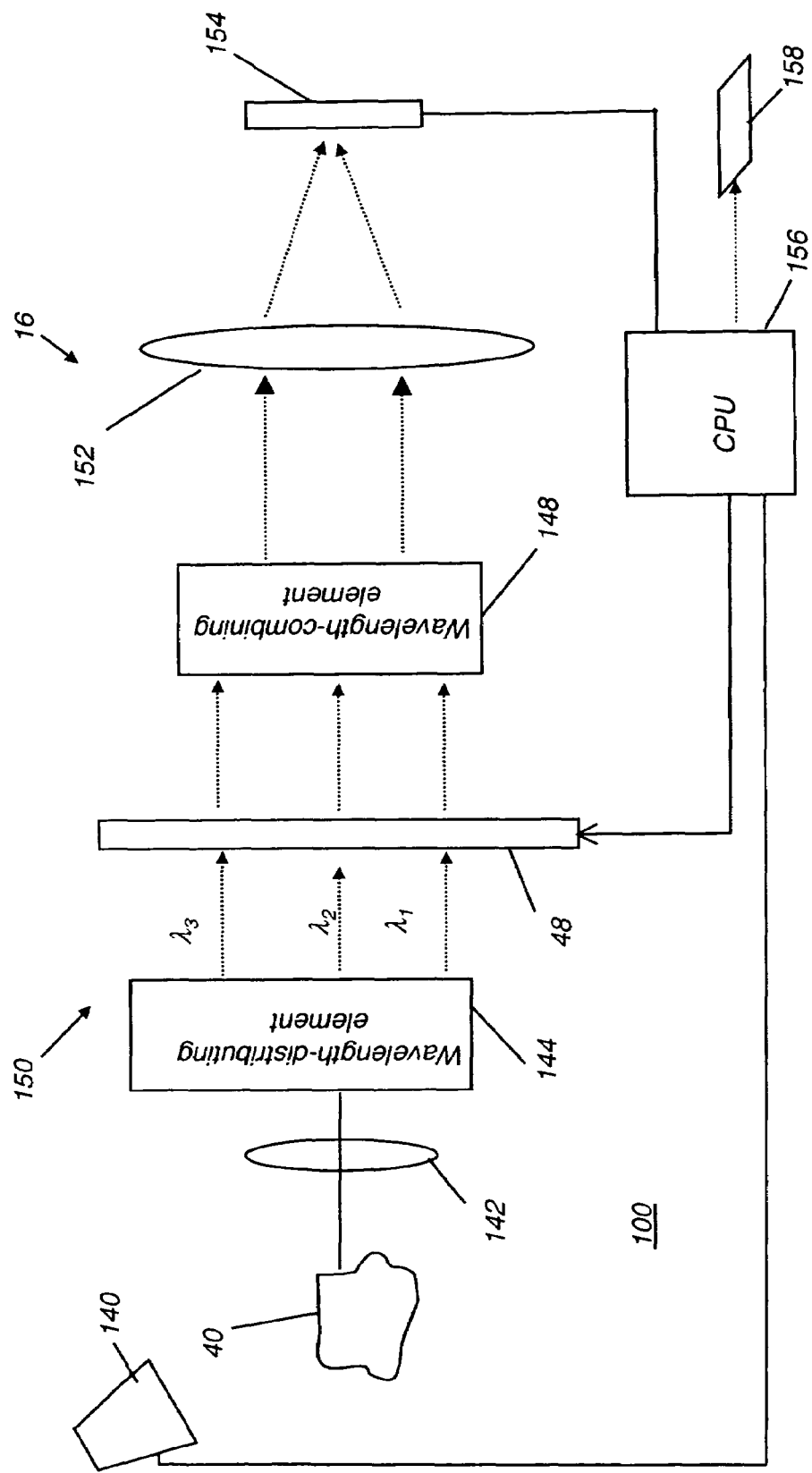
FIG. 17 is a schematic block diagram showing an embodiment of the present invention with a programmable light source.

FIG. 17 shows an embodiment of programmable spectral imaging apparatus 100 with a programmable light source 140. Programmable light sources, such as the Spectrally Programmable Light Engine available from Tidal Photonics, Inc., Vancouver, CA and disclosed, for example, in U.S. Pat. No. 6,781,691 entitled "Apparatus and Methods Relating to Wavelength Conditioning of Illumination" to MacKinnon et al., can provide illumination having various spectral characteristics. Useful, for example, in medical and biological imaging fields, programmable light sources allow the selection of particular wavelengths of illumination for a sample, such as living tissue. This feature is particularly advantageous for cell disease detection, sensing of specific cellular constituents, and similar imaging functions. As shown in FIG. 17, programmable light source 140 can be controlled by instructions from control logic processor 156. This arrangement, in which both the light source and filtering/sensing components are under programmable logic control, provides a complete system solution that is advantaged for optimized imaging at specific wavelengths.

A number of different types of light sources could be employed with programmable spectral imaging apparatus 100, including spectrally programmable light sources of various types, lasers, LEDs, and lamps of various types. The range of wavelengths used can be any suitable wavelengths in visible, UV, and IR regions. A device under test that serves as extended object 40 could be treated in some way to provide an appropriate response to radiation at various wavelengths. For example, living tissue or other biological sample could be injected with a trace substance that fluoresces under certain conditions, yielding imaging information useful for detecting various types of conditions.

Thus it can be seen that, unlike the conventional tunable filter solutions available using LCD, AO, or Fabry-Perot cavity devices, programmable spectral filter 150 can control multiple characteristics such as center frequency and wavelength of the filter passband, number of wavelength bands, bandwidth, and characteristic transmission function shape, in an essentially continuous manner. Moreover, programmable spectral filter 150 can be programmably reconfigured to change filter characteristics during operation, without other adjustments to or substitutions of components.

The invention has been described in detail with particular reference to certain preferred embodiments thereof; but it can be understood that variations and modifications can be effected within the spirit and scope of the invention. For example, while GEMS devices are particularly advantaged due to high switching speeds, excellent contrast, and high fill factor, other types of spatial light modulators could be suitably deployed for programmable spectral filter 150. For example, reflective LCOS (Liquid Crystal On Silicon) devices could be used, with suitable measures taken to account for polarization effects. Digital Micromirror Devices (DMDs), could also be employed, although contrast would not be optimal. The spatial light modulator used could be an area type, such as the LCOS or DMD devices, or could be a linear type, such as a linear GEMS or Grating Light Valve (GLV) device. The image data obtained could be made available for display, printing, or analysis. There are a considerable number of possible arrangements for supporting optics, including multi-component lenses, filters, polarizers, analyzers, apertures, compensators, etc. While some of the embodiments described hereinabove employ patterned mirror 65 as a type of light path selector structure, other types of devices could be used for performing this function.

PARTS LIST

10. Spectral imaging system
12. Light source
14. Object
16. Spectral imager
18. Line
20. Point location
22. Forward optics
24. Intermediate image
26. Lens
28. Multispectral image bearing light
30. Spectral switching section
32. Lens
34. Dichroic separator
36a, 36b, 36c. Optical switch
38. Filter
40. Extended object
42a. Dispersive imaging subsystem
42b. De-dispersive imaging subsystem
44a, 44b, 45a, 45b. Lens
46, 46a, 46b. Grating
47. Stop
48. Spatial light modulator
49. Modulator element
50. Programmable spectral imaging system
51a. Blocking operating state
51b. Unblocking operating state
52. Dispersed images
54. Output image
56. Detector array
60. Lens
62. Imaging light
63. Mirror
64. Phase grating 65. Patterned mirror
67. Beamsplitter
68. Arm
70. Scanning subsystem
72. Object
74 Lens
76. X-cube
77. Scanning element
80. Programmable spectral imaging system
84. Transmissive region
86a, 86b, 86a', 86b'. Area
88. Opaque area
90. Input optics section
92. Patterned mirror
94. Control logic processor
96. Modulated spectral band light
98. Image forming section
100. Imaging apparatus
102a, 102b Curve
104a, 104b Curve
106a, 106b, 106c Curve
108. Curve
110,112 Curve
114, 116, 118, 120, 122, 124 Curve
130. Lens
132. Image sensor
140. Programmable light source
142. Lens
144. Wavelength-distributing element
148. Spectral combining element
150. Programmable spectral filter
152. Lens
154. Sensor
156. Control logic processor
158. Output data
162. Optical compensation element
164a, 164b, 164c. Curve

What is claimed is:

1. An imaging apparatus for obtaining spectral image data from an object comprising:
   a) a light source for directing light toward the object;
   b) an input optics section for gathering light to obtain a multispectral image bearing light;
   c) a programmable spectral filter that conditions the multispectral image bearing light according to a predetermined spectral transmission function, wherein the programmable spectral filter comprises:
      i) a wavelength distributing element for distributing spectral components of the multispectral image bearing light to provide an input spatially distributed image bearing light;
      ii) at least one spatial light modulator in the path of the input spatially distributed image-bearing light, the at least one spatial light modulator comprising a plurality of addressable areas, at least one addressable area modulating a corresponding spectral band of the spatially distributed image bearing light according to the spectral transmission function to provide one or more output modulated spectral bands of image-bearing light such that the input spatially distributed image-bearing light and the output modulated spectral bands are substantially parallel to each other and travel in opposite directions when in close proximity to the spatial light modulator, and wherein the spectral transmission function provides a continuously variable transmission;
      iii) a wavelength recombining element in the path of the output modulated spectral bands of image-bearing light, wherein the wavelength recombining element recombines the one or more modulated spectral bands of image-bearing light to form a conditioned multispectral image bearing light;
   d) a detector array in the path of the conditioned multispectral image bearing light and providing a corresponding output signal; and,
   e) a control logic processor in communication with the spatial light modulator for modulating addressable areas of the spatial light modulator to provide the spectral transmission function thereby.

2. An imaging apparatus for obtaining spectral image data from an object comprising:
   a) a light source for directing light toward the object;
   b) an input optics section for gathering light to obtain a multispectral image bearing light;
   c) a programmable spectral filter that conditions the multispectral image bearing light according to a predetermined spectral transmission function, wherein the programmable spectral filter comprises:
      i) a wavelength distributing element for distributing spectral components of the multispectral image bearing light to provide an input spatially distributed image bearing light;
      ii) at least one spatial light modulator in the path of the input spatially distributed image-bearing light, the at least one spatial light modulator comprising a plurality of addressable areas, at least one addressable area modulating a corresponding spectral band of the spatially distributed image bearing light according to the spectral transmission function to provide one or more output modulated spectral bands of image-bearing light such that the input spatially distributed image-bearing light and the output modulated spectral bands are substantially parallel to each other and travel in substantially one direction when in close proximity to the spatial light modulator;
      iii) a wavelength recombining element in the path of the output modulated spectral bands of image-bearing light, wherein the wavelength recombining element recombines the one or more modulated spectral bands of image-bearing light to form a conditioned multispectral image bearing light;
   d) a detector array in the path of the conditioned multispectral image bearing light and providing a corresponding output signal; and,
   e) a control logic processor in communication with the spatial light modulator for modulating addressable areas of the spatial light modulator to provide the spectral transmission function thereby.

3. An imaging apparatus for obtaining spectral image data from an object comprising:
   a) a light source for directing light toward the object;
   b) an input optics section for gathering light to obtain a multispectral image bearing light;
   c) a programmable spectral filter that conditions the multispectral image bearing light according to a predetermined spectral transmission function, wherein the programmable spectral filter comprises:
      i) a wavelength distributing element for distributing spectral components of the multispectral image bearing light to provide an input spatially distributed image bearing light;
      ii) at least one spatial light modulator in the path of the input spatially distributed image-bearing light, the at least one spatial light modulator comprising a plurality of addressable areas, at least one addressable area modulating a corresponding spectral band of the spatially distributed image bearing light according to the spectral transmission function to provide one or more output modulated spectral bands of image-bearing light such that the input spatially distributed image-bearing light and the output modulated spectral bands are substantially parallel to each other when in close proximity to the spatial light modulator;

iii) a wavelength recombining element in the path of the output modulated spectral bands of image-bearing light, wherein the wavelength recombining element recombines the one or more modulated spectral bands of image-bearing light to form a conditioned multispectral image bearing light;

d) a detector array in the path of the conditioned multispectral image bearing light and providing a corresponding output signal; and, e) a control logic processor in communication with the spatial light modulator for modulating addressable areas of the spatial light modulator to provide the spectral transmission function such that the spectral transmission function is characterized by a programmable center wavelength and bandwidth.

4. A method for obtaining spectral image data from an object comprising:

a) gathering light to obtain a multispectral image bearing light;

b) conditioning the multispectral image bearing light according to a spectral transmission function that provides a continuously variable transmission by:
  i) distributing spectral components of the multispectral image bearing light to provide an input spatially distributed image bearing light;
  ii) modulating a plurality of spectral bands of the input spatially distributed image bearing light at a spatial light modulator according to the spectral transmission function such that the input spatially distributed image-bearing light and a output modulated spectral bands are substantially parallel to each other when in close proximity to the spatial light modulator;
  iii) recombining the one or more modulated spectral bands of image-bearing light to form the conditioned multispectral image bearing light;

c) directing the conditioned multispectral image bearing light to a detector array for forming the spectral image data.

5. A method for obtaining spectral image data from an object comprising:

a) gathering light to obtain a multispectral image bearing light;

b) conditioning the multispectral image bearing light in an iterative manner according to a spectral transmission function by:
  i) distributing spectral components of the multispectral image bearing light to provide an input spatially distributed image bearing light;
  ii) modulating a plurality of spectral bands of the input spatially distributed image bearing light at a spatial light modulator according to the spectral transmission function such that the input spatially distributed image-bearing light and a output modulated spectral bands are substantially parallel to each other when in close proximity to the spatial light modulator, and wherein the spectral transmission function is iteratively conditioned;
  iii) recombining the one or more modulated spectral bands of image-bearing light to form the conditioned multispectral image bearing light;

c) directing the conditioned multispectral image bearing light to a detector array for forming the spectral image data.

6. A method for obtaining spectral image data from an object comprising:

a) gathering light to obtain a multispectral image bearing light;

b) conditioning the multispectral image bearing light according to a programmable spectral transmission function by:
  i) distributing spectral components of the multispectral image bearing light to provide an input spatially distributed image bearing light;
  ii) modulating a plurality of spectral bands of the input spatially distributed image bearing light at a spatial light modulator according to the spectral transmission function such that the input spatially distributed image-bearing light and a output modulated spectral bands are substantially parallel to each other when in close proximity to the spatial light modulator, and wherein the spectral transmission function is characterized by a programmable center wavelength and bandwidth;
  iii) recombining the one or more modulated spectral bands of image-bearing light to form the conditioned multispectral image bearing light;

c) directing the conditioned multispectral image bearing light to a detector array for forming the spectral image data.

* * * * *